United States Patent
Brunner et al.

(10) Patent No.: US 12,060,666 B2
(45) Date of Patent: Aug. 13, 2024

(54) NONWOVEN FABRIC AND PROCESS FOR THE PRODUCTION THEREOF

(71) Applicant: OMYA INTERNATIONAL AG, Oftringen (CH)

(72) Inventors: Martin Brunner, Wallbach (CH); Christophe Rene Pierre Roux, Lyons (FR); Melanie Monceaux, Wambrechies (FR); Simon Fremeaux, Emmerin (FR)

(73) Assignee: OMYA INTERNATIONAL AG, Oftringen (CH)

( * ) Notice: Subject to any disclaimer, the term of this patent is extended or adjusted under 35 U.S.C. 154(b) by 320 days.

(21) Appl. No.: 17/597,242

(22) PCT Filed: Jul. 9, 2020

(86) PCT No.: PCT/EP2020/069455
§ 371 (c)(1),
(2) Date: Dec. 30, 2021

(87) PCT Pub. No.: WO2021/005182
PCT Pub. Date: Jan. 14, 2021

(65) Prior Publication Data
US 2022/0307172 A1    Sep. 29, 2022

(30) Foreign Application Priority Data
Jul. 11, 2019    (EP) .................................... 19185634

(51) Int. Cl.
*D04H 1/4291*    (2012.01)
*D01F 1/10*    (2006.01)
(Continued)

(52) U.S. Cl.
CPC ............. *D04H 1/4291* (2013.01); *D01F 1/10* (2013.01); *D01F 6/46* (2013.01); *D04H 1/492* (2013.01); *D10B 2321/022* (2013.01)

(58) Field of Classification Search
CPC .... D04H 1/4291; D04H 1/492; D04H 3/0007; D04H 3/16; D04H 3/11; C08K 3/26;
(Continued)

(56) References Cited

U.S. PATENT DOCUMENTS

2007/0122614 A1    5/2007    Peng et al.
2015/0240056 A1*   8/2015    Rentsch .................. C08K 9/04
                                                        427/221

FOREIGN PATENT DOCUMENTS

EP    2371766 A1    10/2011
EP    2447213 A1    5/2012
(Continued)

OTHER PUBLICATIONS

International Search Report from PCT/EP2020/069455, mailed Aug. 24, 2020, 6 pages.
(Continued)

*Primary Examiner* — Camie S Thompson
(74) *Attorney, Agent, or Firm* — ALGM LLP; Harry J. Guttman

(57) ABSTRACT

The present invention relates to a process for the production of a nonwoven fabric. In particular, the present invention relates to the production of a nonwoven fabric having desirable tactile and haptic properties, as well as to the nonwoven fabric itself. The process requires the selection of specific materials and process conditions. The fabric is produced from a masterbatch of isotactic polypropylene homopolymer and a surface-treated calcium carbonate filler.

26 Claims, 1 Drawing Sheet

Hydroentanglement step h)

(51) Int. Cl.
*D01F 6/46* (2006.01)
*D04H 1/492* (2012.01)

(58) Field of Classification Search
CPC ........ C08K 2201/006; C08K 2003/265; C08K 9/04; D10B 2321/022; D01F 6/46; D01F 6/06; D01F 10/10; D01F 10/02; C09C 3/08; C09C 1/021; C08L 2203/12; C08L 23/12; C08J 2323/12; C08J 3/226; C01P 2006/82; C01P 2006/12; C01P 2004/61; C01P 2004/52; C01P 2004/51; C07D 307/60
USPC .................. 442/394, 327; 106/465; 428/523
See application file for complete search history.

(56) References Cited

FOREIGN PATENT DOCUMENTS

| | | |
|---|---|---|
| EP | 2524898 A1 | 11/2012 |
| EP | 2749679 A1 | 7/2014 |
| EP | 2840065 A1 | 2/2015 |
| EP | 3028830 A1 | 6/2016 |
| WO | 2008/077156 A2 | 6/2008 |
| WO | 2011/028934 A1 | 3/2011 |
| WO | 2013/142473 A1 | 9/2013 |
| WO | 2014/060286 A1 | 4/2014 |
| WO | 2014/128087 A1 | 8/2014 |
| WO | 2016/087286 A1 | 6/2016 |

OTHER PUBLICATIONS

Written Opinion from PCT/EP2020/069455, mailed Aug. 24, 2020, 8 pages.
Skoog et al (2018) "Chapter 31, Thermal Methods" in Principals of Instrumental Analysis, Seventh Edition, Cengage Learning, Boston, MA., pp. 820-833.
Koslowski (2010) "Dictionary of Man-Made Fibers, 2nd Edition", Deutscher Fachverlag GMBH, Frankfurt am Main, p. 279.
Noelle et al. "Perfecting the spunlace process: Evolution of ANDRITZ injector technology and the development of neXjet " ANDRITZ website; https://www.andritz.com/resource/blob/79474/aeac7cbe4d194f58b31179ac2c4de21b/nexjet-injector-andritz-nonwoven-e-2017-02--data.pdf (accessed Mar. 3, 2020) (7 pages).
Rawal et al. (2007) "Optimization of Parameters in Hydroentanglement Process" Journal of Industrial Textiles, vol. 36, No. 3, 207-220.

* cited by examiner

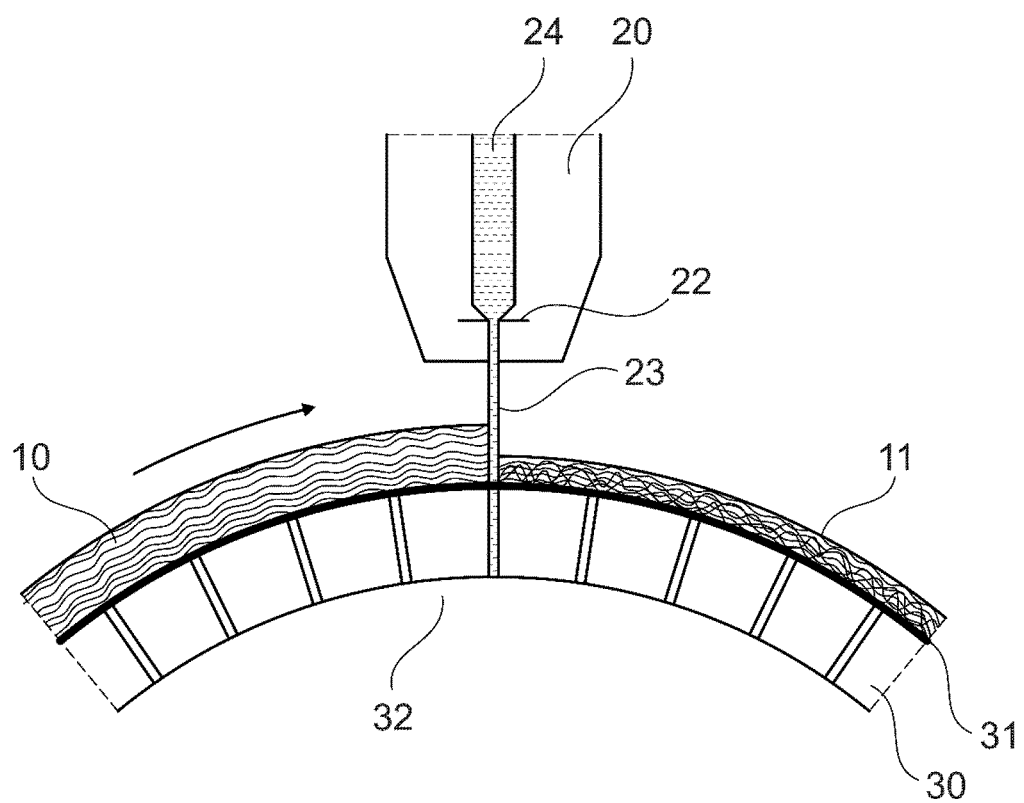
Hydroentanglement step h)

NONWOVEN FABRIC AND PROCESS FOR THE PRODUCTION THEREOF

FIELD OF THE INVENTION

The present invention relates to a process for the production of a nonwoven fabric. In particular, the present invention relates to the production of a nonwoven fabric having desirable tactile and haptic properties, as well as to the nonwoven fabric itself.

BACKGROUND OF THE INVENTION

Nonwovens are flexible sheet or web structures, which are produced by interlocking networks of staple fibers and/or filaments, which are used in many applications, such as textiles for clothing, footwear and baggage, filter products, household and industrial products, hygiene products and the like. Due to their absorbent properties, they are frequently used in personal care products, such as absorbent hygiene products, baby wipes, cleansing wipes, or antibacterial wipes.

Today, nonwovens are mainly produced from thermoplastic polymers, such as polypropylene, polyethylene, polyesters, or polyamides, or semi-synthetic fibers, such as viscose. Thermoplastic polymers may be formed into staple fibers and/or filaments by a variety of methods, such as melt-blown or spunlaid processes. Nonwovens produced from thermoplastic polymers may show a range of desirable properties, such as high tensile strength, both in machine direction (MD) and cross direction (CD), tear resistance, high puncture resistance, flexibility, absorbency, breathability, and abrasion resistance.

Although thermoplastic polymer fibers typically have a very smooth surface, a nonwoven formed from said fibers tends to have undesirable tactile and haptic properties, such as a very slick and oily handfeel. Even if the fiber roughness may be increased to some extent by incorporating mineral fillers, such as calcium carbonate, into the polymeric fibers, the incorporation can lead to lower tensile strength of the fibers, which causes processing issues, such as fiber breakages, pressure buildup at the die, or "sticky" fibers, and deteriorates the mechanical properties of the nonwoven fabric.

Some of the aforementioned disadvantages are believed to originate from large calcium carbonate particles and/or poorly dispersed aggregates of calcium carbonate particles. It has been suggested in WO 2014/060286 A1 to use calcium carbonate having a specific particle size distribution. Furthermore, surface-treatment of the calcium carbonate particles with, e.g., carboxylic acids, like stearic acid or alkyl-substituted succinic acid anhydrides has been suggested to render the calcium carbonate particles less polar, thereby improving their dispersion in the final polymer fiber. In this respect, EP 3 028 830 A1 describes a process for the dispersion of calcium carbonate particles in a polymeric matrix. Furthermore, US 2007/0122614 A1 discloses a method for forming a bicomponent fiber having a core-sheath structure with stearic acid-coated calcium carbonate particles on the outer surface of the fiber. However, the total amount of calcium carbonate in the fibers is rather low. Likewise, WO 2011/028934 A1 refers to a stearic acid-coated calcium carbonate, which is incorporated into polymer fibers for nonwovens.

In the production process of nonwoven fabrics, the obtained fibers finally have to be consolidated in a web bonding step to yield a nonwoven fabric having a suitable strength for the intended applications. Commonly employed methods in the field of personal care products include thermobonding, also called calendaring, or chemical bonding. These processes lead to a structure or surface, which causes the nonwoven to have undesirable tactile and haptic properties. Alternative processes may be needle-punching or hydroentanglement. Needlepunching tends to impart significant material stress to the nonwoven fabric, and may lead to fiber breakage and deterioration of mechanical strength of the material. Hydroentangling, also known as spunlacing, is a process, which employs high pressure water jets to entangle fibers in a loose web, thereby creating a fabric held together by frictional forces between said fibers.

The aforementioned processes as described in the art, however, do not allow for the formation of a nonwoven fabric having "cotton feel" haptic properties, while at the same time preferably retaining the good mechanical and absorbent properties at acceptable costs.

Accordingly, it is an objective of the present invention to provide a process for the production of a nonwoven having desirable tactile and haptic properties ("cotton feel"), while essentially retaining the desired mechanical properties of the nonwoven. It would also be desirable to provide such process, which can be performed without die-buildup and/or fiber breakages. Furthermore, it would also be desirable to provide a nonwoven containing a reduced amount of polymer without affecting the quality of the nonwoven significantly.

The foregoing and other objectives are solved by the subject-matter as defined in the claims enclosed herewith.

According to a first aspect of the present invention, a process is provided, which allows for the provision of a nonwoven fabric with good tactile and haptic properties ("cotton feel"). These good tactile and haptic properties ("cotton feel") can be inter alia reflected by a higher water vapor transmission rate. The process involves the steps of a) providing a surface-treated calcium carbonate-containing filler material, the surface-treated calcium carbonate-containing filler material comprising a calcium carbonate-containing filler material having prior to the surface treatment
   i) a weight median particle size ($d_{50}$) value in the range from 0.1 μm to 7 μm,
   ii) a top cut ($d_{98}$) value of 15 μm or less,
   iii) a specific surface area (BET) from 0.5 to 120 $m^2/g$, as measured by the BET method, and
   iv) a residual total moisture content from 0.01 wt.-% to 1 wt.-%, based on the total dry weight of the at least one calcium carbonate-containing filler material,
   and a surface-treatment layer on at least a part of the surface of said calcium carbonate-containing filler material, wherein the surface-treatment layer is formed by contacting the calcium carbonate-containing filler material with a surface treatment agent in an amount from 0.1 to 3 wt.-%, based on the total dry weight of the calcium carbonate-containing filler material, and wherein the surface treatment agent comprises at least one carboxylic acid and/or a salt or anhydride thereof;

b) providing a first polypropylene polymer being an isotactic polypropylene homopolymer having a melt flow rate MFR (230° C./2.16 kg) in the range of 15 to 40 g/10 min, as measured according to EN ISO 1133: 2011;

c) providing a second polypropylene polymer being an isotactic polypropylene homopolymer having a melt flow rate MFR (230° C./2.16 kg) in the range of 15 to 40 g/10 min, as measured according to EN ISO 1133: 2011;

d) forming a masterbatch by compounding the surface-treated calcium carbonate-containing filler material of step a) in an amount of 60 wt. % to 75 wt.-%, based on the total weight of the masterbatch, with the first polypropylene polymer of step b);

e) mixing the masterbatch of step d) with the second polypropylene polymer of step c) to obtain a mixture having a surface-treated calcium carbonate-containing filler material content in the range of 5 wt.-% to 15 wt.-%, based on the total weight of the mixture, f) forming the mixture of step e) into fibers having an average fiber diameter in the range from 11 to 30 μm or in the range from 15 to 35 μm, g) forming a fibrous web from the fibers of step f), and h) forming the non-woven fabric by hydroentanglement of the fibrous web of step g), wherein the water pressure during hydroentanglement step h) does not exceed 170 bar and wherein the final bonding step during hydroentanglement is carried out at a water pressure in the range of 80 to 170 bar.

The inventors surprisingly found that the foregoing process leads to a nonwoven fabric having unique tactile and haptic properties, i.e., a material having a natural "cotton feel", while still having good mechanical properties, by virtue of the interplay of the process steps and parameters as outlined herein. In particular, the inventors surprisingly found that a calcium carbonate-containing filler material, having a specific particle size distribution and a specific surface-treatment layer can be uniformly dispersed in a first polypropylene polymer of "fiber-grade" quality, i.e., having a specific melt flow rate, by the formation of a masterbatch, having a specific concentration of the surface-treated calcium carbonate-containing filler material. The masterbatch, comprising the uniformly dispersed surface-treated calcium carbonate-containing filler material, according to the present invention is then mixed with a second polypropylene polymer of "fiber-grade" quality to form a mixture, which can be formed into fibers, which, after laying into a fibrous web and bonding by hydroentanglement, form a nonwoven fabric having the desired tactile and haptic properties. These properties, i.e., the "cotton-feel", can be reflected by a water vapor transmission rate (WVTR) of at least 1000 g/(m² day), measured according to ASTM E398-13. It should be understood that the WVTR represents a measure of the tactile and haptic properties, for example the "downiness", as will be described herein below. However, the present invention is not primarily concerned with the provision of breathable materials as such. Furthermore, it is to be understood that the combination of the aforementioned process steps finally yields the nonwoven fabric having said desired properties.

Advantageous embodiments of the inventive process for preparing a nonwoven fabric are defined in the corresponding dependent claims.

In one embodiment, the nonwoven fabric has a water vapor transmission rate of at least 1000 g/(m² day), measured according to ASTM E398-13, preferably of at least 2000 g/(m² day), and more preferably of at least 3000 g/(m² day).

In another embodiment, the surface-treated calcium carbonate-containing filler material of step a) comprises a calcium carbonate-containing filler material having prior to the surface treatment i) a weight median particle size ($d_{50}$) value in the range from 0.25 μm to 5 μm, preferably from 0.5 to 4 μm, more preferably from 0.5 to 4 μm, most preferably from 1.0 to 3.5 μm, and/or ii) a top cut ($d_{98}$) value of 15 μm or less, preferably of 12.5 μm or less, more preferably of 10 μm or less, most preferably of 7.5 μm or less, and/or iii) a specific surface area (BET) from 0.5 to 120 m²/g, preferably from 0.5 to 50 m²/g, more preferably from 0.5 to 35 m²/g, most preferably from 0.5 to 15 m²/g, as measured by the BET method, and/or iv) a residual total moisture content from 0.01 wt.-% to 0.2 wt.-%, preferably from 0.02 wt.-% to 0.15 wt.-%, based on the total dry weight of the at least one calcium carbonate-containing filler material.

In yet another embodiment, the surface-treated calcium carbonate-containing filler material of step a) comprises a surface-treatment layer on at least a part of the surface of said calcium carbonate-containing filler material, wherein the surface-treatment layer is formed by contacting the calcium carbonate-containing filler material with a surface treatment agent in an amount from 0.1 to 2.5 wt.-%, preferably 0.1 to 2.0 wt.-%, more preferably 0.1 to 1.0 wt.-%, and most preferably 0.2 to 0.8 wt.-%, based on the total dry weight of the calcium carbonate-containing filler material.

In still another embodiment, the surface treatment agent comprises at least one monocarboxylic acid and/or a salt or anhydride thereof, preferably comprises at least one monocarboxylic acid and/or a salt thereof, and most preferably comprises stearic acid and/or a salt thereof.

In one embodiment, the surface treatment agent comprises at least one dicarboxylic acid and/or a salt or anhydride thereof, preferably comprises at least one mono-substituted succinic anhydride and/or mono-substituted succinic acid and/or a salt thereof, and most preferably comprises at least one mono-substituted succinic anhydride.

In another embodiment, the first polypropylene polymer of step b) and/or the second polypropylene polymer of step c) is an isotactic polypropylene homopolymer having a melt flow rate MFR (230° C./2.16 kg) in the range of 20 to 35 g/10 min, preferably 25 to 35 g/10 min, as measured according to EN ISO 1133:2011 wherein the first polypropylene polymer of step b) and the second polypropylene polymer of step c) are preferably the same polymer.

In yet another embodiment, the masterbatch is formed in step d) by compounding the surface-treated calcium carbonate-containing filler material of step a) in an amount of 65 wt.-% to 74 wt.-%, preferably 68 wt.-% to 72 wt.-%, based on the total weight of the masterbatch, with the first polypropylene polymer of step b).

In still another embodiment, the fibers formed in step f) are staple fibers having an average fiber diameter in the range from 14 to 30 μm, preferably from 14 to 25 μm, or from 15 to 30 μm, and most preferably from 15 to 25 μm, and/or a titer in the range from 1 to 6 dtex, preferably 1.5 to 4 dtex, as measured by EN ISO 2062:2009 and/or a staple fiber length in the range from 30 to 90 mm, preferably 40 to 60 mm, wherein the staple fibers are preferably formed from the mixture of step e) by a process comprising the steps of multifilament or monofilament extrusion and cutting, and/or wherein the staple fibers are formed into a fibrous web during step g), preferably by carding. In one embodiment, the fibers formed in step f) are filaments having an average fiber diameter in the range from 14 to 30 µm, preferably from 14 to 25 µm, or from 15 to 30 µm, and most preferably from 15 to 25 µm, and/or a titer in the range from 1 to 6 dtex, preferably 1.5 to 4 dtex, as measured by EN ISO 2062:2009, wherein the filaments are preferably formed from the mixture of step e) or e2) by spunbonding and/or meltblowing.

In another embodiment, in hydroentanglement step h)

the pre-bonding step is performed at a water pressure of 50 to 120 bar, preferably 60 to 110 bar, more preferably 65 to 105 bar, and/or the water pressure does not exceed 160 bar, preferably 155 bar, and/or the water pressure of the final bonding step is in the range of 90 to 160 bar, preferably 95 to 155 bar, and/or at least 95%, preferably at least 98%, more preferably at least 99% of the process water is reused, and/or the nonwoven fabric is dried after the final bonding step at a temperature below 135° C., more preferably below 120° C., even more preferably below 100° C.

A second aspect of the invention relates to a nonwoven fabric formed from fibers, wherein the fibers have an average fiber diameter in the range from 11 to 30 µm or in the range from 15 to 35 µm and are composed of a mixture comprising a first polypropylene polymer, being an isotactic polypropylene homopolymer having a melt flow rate MFR (230° C./2.16 kg) in the range of 15 to 40 g/10 min, as measured according to EN ISO 1133:2011;

a second polypropylene polymer being an isotactic polypropylene homopolymer having a melt flow rate MFR (230° C./2.16 kg) in the range of 15 to 40 g/10 min, as measured according to EN ISO 1133:2011, and a surface-treated calcium carbonate-containing filler material, the surface-treated calcium carbonate-containing filler material comprising a calcium carbonate-containing filler material having prior to the surface treatment i) a weight median particle size ($d_{50}$) value in the range from 0.1 µm to 7 µm, ii) a top cut ($d_{98}$) value of 15 µm or less, iii) a specific surface area (BET) from 0.5 to 120 m$^2$/g, as measured by the BET method, and iv) a residual total moisture content of from 0.01 wt.-% to 1 wt.-%, based on the total dry weight of the at least one calcium carbonate-containing filler material, and a surface-treatment layer on at least a part of the surface of said calcium carbonate-containing filler material, wherein the surface-treatment layer is formed by contacting the calcium carbonate-containing filler material with a surface treatment agent in an amount from 0.1 to 3 wt.-%, based on the total dry weight of the calcium carbonate-containing filler material, and wherein the surface treatment agent comprises at least one carboxylic acid and/or a salt or anhydride thereof;

wherein the surface-treated calcium carbonate-containing material is contained in the mixture in an amount from 5 wt.-% to 15 wt.-%, based on the total weight of the mixture, and wherein the nonwoven fabric has a water vapor transmission rate (VWTR) of at least 1000 g/(m$^2$ day), measured according to ASTM E398-13.

The inventors surprisingly found that a nonwoven fabric, which is obtained from a mixture of the foregoing specific polypropylene polymers and the specific surface-treated calcium carbonate-containing filler material in the defined specific amounts, has the desirable tactile and haptic properties, i.e., the natural "cotton feel" as reflected by a water vapor transmission rate (WVTR) of the nonwoven fabric being within the specific claimed range. The water vapor transmission rate can be adjusted to lie within the claimed range by the specific process as described herein, which requires e.g. specific hydro entanglement conditions.

Advantageous embodiments of the inventive nonwoven fabric are defined in the corresponding dependent claims and the exemplary embodiments as follows.

In one embodiment, the nonwoven fabric has a water vapor transmission rate of at least 2000 g/(m$^2$ day), and preferably of at least 3000 g/(m$^2$ day), measured according to ASTM E398-13.

In another embodiment, the surface-treated calcium carbonate-containing filler material comprises a calcium carbonate-containing filler material having prior to the surface treatment i) a weight median particle size ($d_{50}$) value in the range from 0.25 µm to 5 µm, preferably from 0.5 to 4 µm, more preferably from 0.5 to 4 µm, most preferably from 1.0 to 3.5 µm, and/or ii) a top cut ($d_{98}$) value of 15 µm or less, preferably of 12.5 µm or less, more preferably of 10 µm or less, most preferably of 7.5 µm or less, and/or iii) a specific surface area (BET) from 0.5 to 120 m$^2$/g, preferably from 0.5 to 50 m$^2$/g, more preferably from 0.5 to 35 m$^2$/g, most preferably from 0.5 to 15 m$^2$/g, as measured by the BET method, and/or iv) a residual total moisture content from 0.01 wt.-% to 0.2 wt.-%, preferably from 0.02 wt.-% to 0.15 wt.-%, based on the total dry weight of the at least one calcium carbonate-containing filler material.

In yet another embodiment, the surface-treated calcium carbonate-containing filler material comprises a surface-treatment layer on at least a part of the surface of said calcium carbonate-containing filler material, wherein the surface-treatment layer is formed by contacting the calcium carbonate-containing filler material with a surface treatment agent in an amount from 0.1 to 2.5 wt.-%, preferably 0.1 to 2.0 wt.-%, more preferably 0.1 to 1.0 wt.-%, and most preferably 0.2 to 0.8 wt.-%, based on the total dry weight of the calcium carbonate-containing filler material.

In still another embodiment, the surface treatment agent comprises at least one monocarboxylic acid and/or a salt or anhydride thereof, preferably comprises at least one monocarboxylic acid and/or a salt thereof, and most preferably comprises stearic acid and/or a salt thereof.

In one embodiment, the surface treatment agent comprises at least one dicarboxylic acid and/or a salt or anhydride thereof, preferably comprises at least one mono-substituted succinic anhydride and/or mono-substituted succinic acid and/or a salt thereof, and most preferably comprises at least one mono-substituted succinic anhydride.

In another embodiment, the first polypropylene polymer and/or the second polypropylene polymer is an isotactic polypropylene homopolymer having a melt flow rate MFR (230° C./2.16 kg) in the range of 20 to 35 g/10 min, preferably 25 to 35 g/10 min, as measured according to EN ISO 1133:2011, wherein the first polypropylene polymer and the second polypropylene polymer are preferably the same polymer.

In yet another embodiment, the fibers are staple fibers having an average fiber diameter in the range from 14 to 30 µm, preferably from 14 to 25 µm, or from 15 to 30 µm, and most preferably from 15 to 25 µm, and/or a titer in the range from 1 to 6 dtex, preferably 1.5 to 4 dtex, as measured by EN ISO 2062:2009 and/or a staple fiber length in the range from 30 to 90 mm, preferably 40 to 60 mm, wherein the staple fibers are preferably formed from the mixture of step e) by a process comprising the steps of multifilament or monofilament extrusion and cutting, and/or wherein the staple fibers are formed into a fibrous web during step g) preferably by carding.

In still another embodiment, the fibers are filaments having an average fiber diameter in the range from 14 to 30 µm, preferably from 14 to 25 µm, or from 15 to 30 µm, and most preferably from 15 to 25 µm, and/or a titer in the range from 1 to 6 dtex, preferably 1.5 to 4 dtex, as measured by EN ISO 2062:2009, wherein the filaments are preferably formed from the mixture of step e) or e2) by spunbonding and/or meltblowing.

A third aspect of the present invention relates to the use of the surface-treated calcium carbonate-containing filler material for the manufacture of a nonwoven fabric having a water vapor transmission rate of at least 1000 g/(m² day), measured according to ASTM E398-13, preferably of at least 2000 g/(m² day), and more preferably of at least 3000 g/(m² day), wherein the surface-treated calcium carbonate-containing filler material comprises a calcium carbonate-containing filler material having prior to the surface treatment i) a weight median particle size ($d_{50}$) value in the range from 0.1 µm to 7 µm, ii) a top cut ($d_{98}$) value of 15 µm or less, iii) a specific surface area (BET) from 0.5 to 120 m²/g, as measured by the BET method, and iv) a residual total moisture content of from 0.01 wt.-% to 1 wt.-%, based on the total dry weight of the at least one calcium carbonate-containing filler material, and a surface-treatment layer on at least a part of the surface of said calcium carbonate-containing filler material, wherein the surface-treatment layer is formed by contacting the calcium carbonate-containing filler material with a surface treatment agent in an amount from 0.1 to 3 wt.-%, based on the total dry weight of the calcium carbonate-containing filler material, and wherein the surface treatment agent comprises at least one carboxylic acid and/or a salt or anhydride thereof.

It was surprisingly found out that the surface-treated calcium carbonate-containing filler material as defined according to the third aspect of the invention, when used for the manufacture of a nonwoven fabric, increases the surface roughness of the fibers of the nonwoven fabric having a water vapor transmission rate as claimed. The nonwoven fabric consequently has the desirable tactile and haptic properties, i.e., a natural "cotton feel".

Advantageous embodiments of the inventive use of the surface-treated calcium carbonate-containing filler material are defined in the corresponding dependent claims and the exemplary embodiments as follows.

In one embodiment, the surface-treated calcium carbonate-containing filler material comprises a calcium carbonate-containing filler material having prior to the surface treatment i) a weight median particle size ($d_{50}$) value in the range from 0.25 µm to 5 µm, preferably from 0.5 to 4 µm, more preferably from 0.5 to 4 µm, most preferably from 1.0 to 3.5 µm, and/or ii) a top cut ($d_{98}$) value of 15 µm or less, preferably of 12.5 µm or less, more preferably of 10 pm or less, most preferably of 7.5 µm or less, and/or iii) a specific surface area (BET) from 0.5 to 120 m²/g, preferably from 0.5 to 50 m²/g, more preferably from 0.5 to 35 m²/g, most preferably from 0.5 to 15 m²/g, as measured by the BET method, and/or iv) a residual total moisture content from 0.01 wt.-% to 0.2 wt.-%, preferably from 0.02 wt.-% to 0.15 wt.-%, based on the total dry weight of the at least one calcium carbonate-containing filler material.

In another embodiment, the surface-treated calcium carbonate-containing filler material comprises a surface-treatment layer on at least a part of the surface of said calcium carbonate-containing filler material, wherein the surface-treatment layer is formed by contacting the calcium carbonate-containing filler material with a surface treatment agent in an amount from 0.1 to 2.5 wt.-%, preferably 0.1 to 2.0 wt.-%, more preferably 0.1 to 1.0 wt.-%, and most preferably 0.2 to 0.8 wt.-%, based on the total dry weight of the calcium carbonate-containing filler material.

In yet another embodiment, the surface treatment agent comprises at least one monocarboxylic acid and/or a salt or anhydride thereof, preferably comprises at least one monocarboxylic acid and/or a salt thereof, and most preferably comprises stearic acid and/or a salt thereof.

In still another embodiment, the surface treatment agent comprises at least one dicarboxylic acid and/or a salt or anhydride thereof, preferably comprises at least one mono-substituted succinic anhydride and/or mono-substituted succinic acid and/or a salt thereof, and most preferably comprises at least one mono-substituted succinic anhydride.

A fourth aspect of the present invention relates to an article comprising the inventive nonwoven fabric and/or the nonwoven fabric as obtained by the inventive process.

In an exemplary embodiment, the article is selected from the group comprising hygiene products, medical and healthcare products, filter products, geotextile products, agriculture and horticulture products, clothing, footwear and baggage products, household and industrial products, packaging products, construction products and the like.

When in the following reference is made to specific and/or preferred embodiments of one aspect, like the inventive process, it is to be understood that these embodiments also refer to the other aspects, e.g. to specific and/or preferred embodiments of the inventive product, the inventive use and the inventive article.

It should be understood that for the purposes of the present invention, the following terms have the following meanings:

The term "surface-treated calcium carbonate-containing filler material" in the meaning of the present invention refers to a material, which has been contacted with a surface-treatment agent such as to obtain a coating layer on at least a part of the surface of the calcium carbonate-containing filler material, wherein the calcium carbonate-containing filler material comprises at least 80 wt.-% calcium carbonate, based on the total dry weight of the surface-treated calcium carbonate-containing filler material.

The term "ground natural calcium carbonate" (GNCC) as used herein refers to a particulate material obtained from natural calcium carbonate-containing minerals, such as chalk, limestone, marble or dolomite, or from organic sources, such as eggshells or seashells, which has been processed in a wet and/or dry comminution step, such as crushing and/or grinding, and optionally has been subjected to further steps such as screening and/or fractionation, for example, by a cyclone or a classifier.

A "precipitated calcium carbonate" (PCC) in the meaning of the present invention is a synthesized material, obtained by precipitation following a reaction of carbon dioxide and calcium hydroxide (hydrated lime) in an aqueous environment. Alternatively, precipitated calcium carbonate can also be obtained by reacting calcium- and carbonate salts, for example calcium chloride and sodium carbonate, in an aqueous environment. PCC may have a vateritic, calcitic or aragonitic crystalline form. PCCs are described, for example, in EP 2 447 213 A1, EP 2 524 898 A1, EP 2 371 766 A1, EP 2 840 065 A1, or WO 2013/142473 A1.

The "particle size" of the calcium carbonate-containing materials herein is described by its weight distribution of particle sizes $d_x$. Therein, the value $d_x$ represents the diameter relative to which x % by weight of the particles have diameters less than $d_x$. This means that, for example, the $d_{20}$ value is the particle size at which 20 wt.-% of all particles are smaller than that particle size. The $d_{50}$ value is thus the weight median particle size, i.e. 50 wt.-% of all particles are smaller than that particle size and the $d_{98}$ value, referred to as top cut, is the particle size at which 98 wt.-% of all particles are smaller than that particle size. The weight median particle size $d_{50}$ and top cut $d_{98}$ are measured by the sedimentation method, which is an analysis of sedimentation behaviour in a gravimetric field. The measurement is made with a Sedigraph™ 5120 of Micromeritics Instrument Corporation, USA. The method and the instrument are known to the skilled person and are commonly used to determine particle size distributions.

Throughout the present document, the term "specific surface area" (in m²/g), which is used to define calcium carbonate or other materials, refers to the specific surface area as determined by using the BET method (using nitrogen as adsorbing gas), as measured according to ISO 9277:2010.

For the purpose of the present application, the "volatile onset temperature" is defined as the temperature at which volatiles—including volatiles introduced as a result of common mineral filler preparation steps including grinding, with or without grinding aid agents, beneficiation, with or without flotation aid or other agents, and other pre-treatment agents not expressly listed above, detected according to the thermogravimetric analysis described hereafter—begin to evolve, as observed on a thermogravimetric (TGA) curve, plotting the mass of remaining sample (y-axis) as a function of temperature (x-axis), the preparation and interpretation of such a curve being defined hereafter.

TGA analytical methods provide information regarding losses of mass and volatile onset temperatures with great accuracy, and is common knowledge; it is, for example, described in "Principles of Instrumental analysis", fifth edition, Skoog, Holler, Nieman, 1998 (first edition 1992) in Chapter 31 pages 798 to 800, and in many other commonly known reference works. The thermogravimetric analysis (TGA) may be performed using a Mettler Toledo TGA 851 based on a sample of 500 +/−50 mg and scanning temperatures from 25 to 280° C. or 25 to 400° C. at a rate of 20° C./minute under an air flow of 70 ml/min. The skilled man will be able to determine the "volatile onset temperature" by analysis of the TGA curve as follows: the first derivative of the TGA curve is obtained and the inflection points thereon between 150 and 280° C. or 25 to 400° C. are identified. Of the inflection points having a tangential slope value of greater than 45° relative to a horizontal line, the one having the lowest associated temperature above 200° C. is identified. The temperature value associated with this lowest temperature inflection point of the first derivative curve is the "volatile onset temperature". The total weight of the surface treatment agent on the accessible surface area of the filler can be determined by thermogravimetric analysis by mass loss between 105° C. to 400° C.

For the purpose of the present application, the "total volatiles" associated with mineral fillers and evolved over a temperature range of 25 to 280° C. or 25 to 400° C. is characterised according to % mass loss of the mineral filler sample over a temperature range as read on a thermogravimetric (TGA) curve. The "total volatiles" evolved on the TGA curve can be determined using Star® SW 9.01 software. Using this software, the curve is first normalised relative to the original sample weight in order to obtain mass losses in % values relative to the original sample. Thereafter, the temperature range of 25 to 280° C. or 25 to 400° C. is selected and the step horizontal (in German: "Stufe horizontal") option selected in order to obtain the % mass loss over the selected temperature range.

Unless indicated otherwise, the "residual total moisture content" of a material refers to the percentage of moisture (i.e. water) which may be desorbed from a sample upon heating to 220° C. The "residual total moisture contents" is determined according to the Coulometric Karl Fischer measurement method, wherein the filler material is heated to 220° C., and the water content released as vapor and isolated using a stream of nitrogen gas (at 100 ml/min) is determined in a Coulometric Karl Fischer unit (e.g. Mettler-Toledo coulometric KF Titrator C30, combined with Mettler-Toledo oven DO 0337).

The term "moisture pick-up susceptibility" in the meaning of the present invention refers to the amount of moisture adsorbed on the surface of the powder material or surface-treated filler material product and can be determined in mg moisture/g of the dry powder material or surface-treated filler material product after exposure to an atmosphere of 10 and 85% of relative humidity, resp., for 2.5 hours at a temperature of +23° C. (±2° C.).

The term "dry weight of the calcium carbonate-containing filler material" is understood to describe a filler material having less than 0.3% by weight of water relative to the filler material weight. The % water (equal to residual total moisture content) is determined as described herein.

The term "carboxylic acid and/or a salt or anhydride thereof" refers to carboxylic acids, carboxylic acid salts, carboxylic anhydrides and their mixtures. The term "monocarboxylic acid and/or a salt thereof" refers to monocarboxylic acids and monocarboxylic acid salts. The term "dicarboxylic acid and/or a salt or anhydride thereof" refers to dicarboxylic acids, dicarboxylic acid salts, dicarboxylic anhydrides and their mixtures, wherein a "dicarboxylic anhydride" is understood to be an acyclic or cyclic anhydride. The term "succinic anhydride", also called dihydro-2,5-furandione, succinic acid anhydride or succinyl oxide, has the molecular formula $C_4H_4O_3$ and is the acid anhydride of succinic acid. The term "mono-substituted" succinic anhydride in the meaning of the present invention refers to a succinic anhydride substituted with one substituent. The term "mono-substituted" succinic acid in the meaning of the present invention refers to a succinic acid substituted with one substituent.

The terms "alkyl" and "aliphatic" in the meaning of the present invention refers to a linear or branched, saturated organic compound composed of carbon and hydrogen. For example, "alkyl carboxylic acids" are composed of linear or branched, saturated hydrocarbon chains containing a pendant carboxylic acid group.

The term "alkenyl" in the meaning of the present invention refers to a linear or branched, unsaturated organic compound composed of carbon and hydrogen. Said organic compound further contains at least one double bond in the substituent, preferably one double bond. In other words, "alkenyl carboxylic acids" are composed of linear or branched, unsaturated hydrocarbon chains containing a pendant carboxylic acid group. It is appreciated that the term "alkenyl" in the meaning of the present invention includes the cis and trans isomers.

The term "salty reaction products" in the meaning of the present invention refers to products obtained by contacting a calcium carbonate-containing filler material with one or more carboxylic acids and/or salts or anhydrides thereof. Said salty reaction products may be formed between e.g. the carboxylic acid and reactive molecules located at the surface of the calcium carbonate-containing filler material.

As used herein, the term "polymer" generally includes homopolymers and co-polymers such as, for example, block, graft, random and alternating copolymers, as well as blends and modifications thereof. The polymer can be an amorphous polymer, a crystalline polymer, or a semi-crystalline polymer, i.e. a polymer comprising crystalline and amorphous fractions. The degree of crystallinity is specified in percent and can be determined by differential scanning calorimetry (DSC). An amorphous polymer may be characterized by its glass transition temperature and a crystalline polymer may be characterized by its melting point. A semi-crystalline polymer may be characterized by its glass transition temperature and/or its melting point.

For the purpose of the present invention, the expression "polypropylene homopolymer" refers to a polypropylene polymer, which is derived from at least 98 mol-% propylene monomers.

The expression "isotactic polymer" refers to a polymer, wherein more than 95%, preferably more than 97% of all substituents are located on the same side of the macromolecular backbone.

The term "melt flow rate" (MFR) as used herein refers to the mass of the polymer, given in g/10 min, which is discharged through a defined die under specified temperature and pressure conditions. For polypropylene polymers, the MFR is commonly measured under a load of 2.16 kg at 230° C., according to EN ISO 1133:2011. The MFR is a measure of the viscosity of the polymer, which is mainly influenced by the molecular weight of the polymer, but also by the degree of branching or the polydispersity.

The expression "polydispersity index" ($M_w/M_n$) as used herein is a measure of the molecular mass distribution and refers to the ratio of the weight-average molar mass and the number-average molar mass of the polymers as determined by gel permeation chromatography (GPC), e.g., according to EN ISO 16014-1:2019.

The term "masterbatch" refers to a composition having a concentration of the surface treated calcium carbonate-containing filler material that is higher than the concentration of the polymer composition used for preparing the fibers and/or filaments and/or nonwoven fabric. That is to say, the masterbatch is further diluted, e.g., during step e) of the present invention, such as to obtain a polymer composition which is suitable for preparing the nonwoven fabric.

For the purposes of the present invention, the term "fibers" may refer both to "staple fibers" and to "filaments".

The term "staple fiber" in the meaning of the present invention refers to a linear structure forming textile fabrics such as nonwovens which typically consist of fiber webs bonded together by e.g. mechanical methods. Accordingly, the term "staple fiber" is understood to refer to a finite structure.

The term "filament" in the meaning of the present invention refers to a structure that differs from staple fibers by its structure length. Accordingly, the term "filament" is understood to refer to endless fibers. It is further appreciated that the filament may be constructed as mono-, bi- or multi-filament. If a bi- or multi-filament is present, the composition of the single filaments may be substantially the same. That is to say, the compositions of the single filaments comprise substantially the same components, in the same amounts. Alternatively, the composition of the single filaments may be different. That is to say, the compositions of the single filaments may comprise the same components in varying amounts or the compositions of the single filaments may comprise different components in the same amounts.

For the purposes of the present invention, the "titer" of a fiber is a measure of the linear mass density, wherein the linear mass density is given by the density of the polymer and, if present, by the density and concentration of the filler in the fiber. The titer represents an average value of the mass of a single fiber strand per unit of length of the single fiber strand. The unit dtex (decitex) is given in grams per 10 000 meters of fiber.

For the purposes of the present invention, the term "fiber diameter" or "fiber thickness" refers to the thickness of a single fiber orthogonal to the fiber direction, as determined by visible light microscopy, or by calculation using the following equation (i), according to Hans J. Koslowski, Dictionary of Man-Made fibers, $2^{nd}$ Edition, 2010, Deutscher Fachverlag, page 279.

$$\text{fiber diameter } (\mu m) = 11.3 \sqrt{\left(\frac{T(dtex)}{density}\right)} \quad (i)$$

For the purposes of the present invention, the term "staple length" refers to the average length of the staple fibers. The staple length is determined by the distance between the knives during the cutting process of the filaments into fibers.

Where an indefinite or definite article is used when referring to a singular noun, e.g., "a", "an" or "the", this includes a plural of that noun unless anything else is specifically stated.

Where the term "comprising" is used in the present description and claims, it does not exclude other elements. For the purposes of the present invention, the term "consisting of" is considered to be a preferred embodiment of the term "comprising". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined hereinabove.

Terms like "obtainable" or "definable" and "obtained" or "defined" are used interchangeably. This, for example, means that, unless the context clearly dictates otherwise, the term "obtained" does not mean to indicate that, for example, an embodiment must be obtained by, for example, the sequence of steps following the term "obtained" though such a limited understanding is always included by the terms "obtained" or "defined" as a preferred embodiment.

In the following, details and preferred embodiments of the inventive process, the inventive nonwoven fabric, the inventive use of the surface-treated calcium carbonate-containing filler material, and articles comprising said inventive nonwoven fabric will be set out in more detail. It is to be understood that the technical details and embodiments, which are described for any one of the aspects of the present invention, also apply to each of the remaining aspects of the invention.

The Surface-Treated Calcium Carbonate-Containing Filler Material

The inventive process, the inventive product, the inventive use, and the inventive article make use of a surface-treated calcium carbonate-containing filler material. For the purposes of the present invention, the surface-treated calcium carbonate-containing filler material prior to the surface treatment step will be denoted as the "calcium carbonate-containing filler material". Accordingly, the surface-treated calcium carbonate-containing filler material is formed by contacting the calcium carbonate-containing filler material with a surface treatment agent in an amount from 0.1 to 3 wt.-%, based on the total dry weight of the calcium carbonate-containing filler material, and wherein the surface treatment agent comprises at least one carboxylic acid and/or a salt or anhydride thereof.

The Calcium Carbonate-Containing Filler Material

The calcium carbonate-containing filler material in the meaning of the present invention refers to a material selected from the group consisting of ground natural calcium carbonate (GNCC), precipitated calcium carbonate (PCC) and mixtures thereof.

Preferably, the calcium carbonate-containing filler material is a GNCC.

According to one embodiment of the present invention, the amount of calcium carbonate in the calcium carbonate-comprising filler material is at least 80 wt.-%, e.g. at least 95 wt.-%, preferably between 97 and 100 wt.-%, more preferably between 98.5 and most preferably 99.95 wt.-%, based on the total dry weight of the calcium carbonate-comprising filler material.

The at least one calcium carbonate-comprising filler material is in the form of a particulate material, and has a particle size distribution as required for the production of the nonwoven according to the invention. Thus, the calcium carbonate-comprising filler material has a weight median particle size $d_{50}$ from 0.1 μm to 7 μm, preferably from 0.25 μm to 5 μm, more preferably from 0.5 μm to 4 μm, and most preferably from 1.0 to 3.5 μm.

Accordingly, the calcium carbonate-comprising filler material has a top cut ($d_{98}$) of ≤15 μm, preferably of ≤12.5 μm, more preferably of ≤10 μm, and most preferably of ≤7.5 μm. It is understood that the top cut of the material is selected such that fiber formation step f) can be performed essentially without disturbance, e.g., without large calcium-carbonate particles clogging the dies and/or the holes of the spinneret.

Furthermore, the calcium carbonate-comprising filler material has a BET specific surface area of from 0.5 and 150 $m^2/g$, preferably from 0.5 to 50 $m^2/g$, more preferably from 0.5 to 35 $m^2/g$, and most preferably from 0.5 to 15 $m^2/g$, as measured using nitrogen and the BET method according to ISO 9277:2010.

According to one embodiment of the present invention, the calcium carbonate-comprising filler material has a weight median particle size $d_{50}$ from 0.1 μm to 7 μm and/or a top cut ($d_{98}$) of 15 μm and/or a specific surface area (BET) of from 0.5 to 120 $m^2/g$, as measured using nitrogen and the BET method according to ISO 9277:2010.

In one embodiment of the present invention, the calcium carbonate-comprising filler material is preferably a marble having a median particle size diameter $d_{50}$ value from 0.1 μm to 7 μm, preferably from 0.25 μm to 5 μm, more preferably from 0.5 to 4 μm, and most preferably from 1.0 μm to 3.5 μm. In this case, the at least one calcium carbonate-comprising filler material may exhibit a BET specific surface area of from 0.5 to 150 $m^2/g$, preferably of from 0.5 to 50 $m^2/g$, more preferably of from 0.5 to 35 $m^2/g$ and most preferably of from 0.5 to 15 $m^2/g$, measured using nitrogen and the BET method according to ISO 9277:2010.

For example, the calcium carbonate-comprising filler material may have a median particle size diameter $d_{50}$ value from 0.25 μm to 5 μm, preferably from 0.5 to 4 μm, more preferably from 1.0 μm to 3.5 μm, a top cut ($d_{98}$) of 10 μm, more preferably of 7.5 μm, and a BET specific surface area of from 0.5 to 50 $m^2/g$, preferably of from 0.5 to 35 $m^2/g$ and most preferably of from 0.5 to 15 $m^2/g$, measured using nitrogen and the BET method according to ISO 9277:2010.

It is preferred that the calcium carbonate-comprising filler material is a dry ground material, a material being wet ground and dried or a mixture of the foregoing materials. In general, the grinding step can be carried out with any conventional grinding device, for example, under conditions such that refinement predominantly results from impacts with a secondary body, i.e., in one or more of a ball mill, a rod mill, a vibrating mill, a roll crusher, a centrifugal impact mill, a vertical bead mill an attrition mill, a pin mill, a hammer mill, a pulveriser, a shredder, a de-clumper, a knife cutter, or other such equipment known to the skilled man.

In case the calcium carbonate-comprising filler material is a wet ground calcium carbonate-comprising filler material, the grinding step may be performed under conditions such that autogenous grinding takes place and/or by horizontal ball milling, and/or other such processes known to the skilled man. It is to be noted that the same grinding methods can be used for dry grinding the calcium carbonate-comprising filler material. The wet processed ground calcium carbonate-comprising filler material thus obtained may be washed and dewatered by well-known processes, e.g. by flocculation, filtration or forced evaporation prior to drying. The subsequent step of drying may be carried out in a single step such as spray drying, or in at least two steps, e.g. by applying a first heating step to the calcium carbonate-comprising filler material in order to reduce the associated moisture content to a level which is not greater than about 0.5 wt.-%, based on the total dry weight of the calcium carbonate-comprising filler material. The residual total moisture content of the filler can be measured by the Karl Fischer coulometric titration method, desorbing the moisture in an oven at 195° C. and passing it continuously into the KF coulometer (Mettler Toledo coulometric KF Titrator C30, combined with Mettler oven DO 0337) using dry $N_2$ at 100 ml/min, e.g. for 10 min. The residual total moisture content may be further reduced by applying a second heating step to the calcium carbonate-comprising filler material. In case said drying is carried out by more than one drying steps, the first step may be carried out by heating in a hot current of air, while the second and further drying steps are preferably carried out by an indirect heating in which the atmosphere in the corresponding vessel comprises a surface treatment agent. It is also common that the calcium carbonate-comprising filler material is subjected to a beneficiation step (such as a flotation, bleaching or magnetic separation step) to remove impurities.

In one embodiment of the present invention, the calcium carbonate-comprising filler material comprises a dry ground calcium carbonate-comprising filler material. In another preferred embodiment, the calcium carbonate-comprising filler material is a material being wet ground in a horizontal ball mill, and subsequently dried by using the well-known process of spray drying.

According to the present invention the calcium carbonate-comprising filler material has a residual moisture content of from 0.01 to 1 wt.-%, based on the total dry weight of the calcium carbonate-comprising filler material. Depending on the calcium carbonate-comprising filler material, the calcium carbonate-comprising filler material has a residual total moisture content of from 0.01 to 0.2 wt.-%, preferably from 0.02 to 0.15 wt.-% and most preferably from 0.04 to 0.15 wt.-%, based on the total dry weight of the calcium carbonate-comprising filler material.

For example, in case a wet ground and spray dried marble is used as calcium carbonate-comprising filler material, the residual total moisture content of the calcium carbonate-comprising filler material is preferably from 0.01 to 0.1 wt.-%, more preferably from 0.02 to 0.08 wt.-%, and most preferably from 0.04 to 0.07 wt.-%, based on the total dry weight of the calcium carbonate-comprising filler material. If a PCC is used as calcium carbonate-comprising filler material, the residual total moisture content of the calcium carbonate-comprising filler material is preferably of from 0.01 to 0.2 wt.-%, more preferably from 0.05 to 0.17 wt.-%, and most preferably from 0.05 to 0.10 wt.-%, based on the total dry weight of the calcium carbonate-comprising filler material.

The Surface Treatment Layer

According to the present invention, the surface-treated calcium carbonate-containing filler material further comprises a surface-treatment layer on at least a part of the surface of the calcium carbonate-containing filler material, wherein the treatment layer is formed by contacting the calcium carbonate-containing filler material with a surface-treatment agent in an amount from 0.1 to 3 wt.-%, based on the total dry weight of the calcium carbonate-containing filler material, wherein the surface treatment agent comprises at least one carboxylic acid and/or a salt or anhydride thereof.

According to one embodiment, the surface-treated calcium carbonate-containing filler material is formed by contacting the calcium carbonate-containing filler material with a surface-treatment agent in an amount from 0.1 to 2.5 wt.-%, preferably in an amount from 0.1 to 2 wt.-%, more preferably in an amount from 0.1 to 1.5 wt.-%, even more preferably in an amount from 0.1 to 1 wt.-%, and most preferably in an amount from 0.2 to 0.8 wt.-%, based on the total dry weight of the calcium carbonate-containing filler material.

The surface-treated calcium carbonate-containing filler material according to the present invention has excellent surface characteristics. For example, the surface-treated calcium carbonate-containing filler material may have a high volatile onset temperature, for example ≥250° C., preferably of ≥260° C., and most preferably of ≥270° C., and a high thermal stability, e.g. up to temperatures of 250° C., 270° C., or 290° C. Additionally or alternatively, the surface-treated calcium carbonate-containing filler material may have total volatiles between 25° C. and 350° C. of less than 0.25%, and preferably of less than 0.23% by mass, e.g., of from 0.04 to 0.21% by mass, preferably from 0.08 to 0.15% by mass, more preferably from 0.1 to 0.12% by mass. Furthermore, the surface-treated calcium carbonate-containing filler material may feature a low moisture pick-up susceptibility, characterized by its total surface moisture level of less than 1 mg/g of dry calcium carbonate-comprising filler material, at a temperature of about +23° C. (±2° C.). For example, the surface-treated calcium carbonate-containing filler material has a moisture pick-up susceptibility from 0.1 to 1 mg/g, more preferably from 0.2 to 0.9 mg/g; and most preferably of from 0.2 to 0.8 mg/g of dry calcium carbonate-comprising material at a temperature of +23° C. (±2° C.). Additionally or alternatively, the surface-treated calcium carbonate-containing filler material may have a hydrophilicity of below 8:2 volumetric ratio of water:ethanol measured at +23° C. (±2° C.) with the sedimentation method, for example, of below 7:3 volumetric ratio of water:ethanol measured at +23° C. (±2° C.) with the sedimentation method.

The Surface Treatment Agents

According to one embodiment of the present invention, the surface treatment agent comprises at least one monocarboxylic acid and/or a salt or anhydride thereof.

It is appreciated that the expression "at least one" monocarboxylic acid and/or a salt or anhydride thereof means that one or more kinds of monocarboxylic acids and/or salts or anhydrides thereof may be provided in any aspect of the present invention.

According to a preferred embodiment, surface treatment agent comprises at least one monocarboxylic acid and/or a salt thereof.

The at least one monocarboxylic acid and/or a salt or anhydride thereof may be at least one aliphatic carboxylic acid having a total amount of carbon atoms from C4 to C24 and/or a salt or anhydride thereof.

In one embodiment of the present invention, the aliphatic carboxylic acid and/or a salt or anhydride thereof is selected from saturated unbranched carboxylic acids, that is to say the aliphatic carboxylic acid and/or a salt or anhydride thereof is preferably selected from the group of carboxylic acids consisting of pentanoic acid, hexanoic acid, heptanoic acid, octanoic acid, nonanoic acid, decanoic acid, undecanoic acid, lauric acid, tridecanoic acid, myristic acid, pentadecanoic acid, palmitic acid, heptadecanoic acid, stearic acid, nonadecanoic acid, arachidic acid, heneicosylic acid, behenic acid, tricosylic acid, lignoceric acid, their salts, their anhydrides and mixtures thereof.

In another embodiment of the present invention, the aliphatic carboxylic acid and/or a salt or anhydride thereof is selected from the group consisting of octanoic acid, decanoic acid, lauric acid, myristic acid, palmitic acid, stearic acid, arachidic acid and mixtures thereof. Preferably, the aliphatic carboxylic acid is selected from the group consisting of myristic acid, palmitic acid, stearic acid, their salts, their anhydrides and mixtures thereof.

Preferably, the aliphatic carboxylic acid and/or a salt or anhydride thereof is stearic acid and/or a stearic acid salt or stearic anhydride.

Accordingly, it is preferred that the surface-treated calcium carbonate-containing filler material comprises a calcium carbonate-comprising filler material having a median particle size diameter $d_{50}$ value from 0.25 µm to 5 µm, preferably from 0.5 to 4 µm, more preferably from 1.0 µm to 3.5 µm, a top cut ($d_{98}$) of ≤10 µm, more preferably of ≤7.5 µm, and a BET specific surface area of from 0.5 to 50 m²/g, preferably of from 0.5 to 35 m²/g and most preferably of from 0.5 to 15 m²/g, measured using nitrogen and the BET method according to ISO 9277:2010, and a surface-treatment layer on at least a part of the surface of said calcium carbonate-containing filler material, wherein the surface-treatment layer is formed by contacting the calcium carbonate-containing filler material with a surface treatment agent in an amount from 0.1 to 3 wt.-%, based on the total dry weight of the calcium carbonate-containing filler material, and wherein the surface treatment agent comprises stearic acid and/or a salt thereof.

The at least one monocarboxylic acid and/or a salt or anhydride thereof may be at least one aliphatic carboxylic acid having a total amount of carbon atoms from C4 to C24 and/or a salt or anhydride thereof.

In another embodiment of the present invention, the at least one monocarboxylic acid and/or a salt or anhydride thereof may be at least one alkenyl carboxylic acid having a total amount of carbon atoms from C4 to C24 and/or a salt or anhydride thereof.

For example, the alkenyl carboxylic acid and/or a salt or anhydride thereof is selected from saturated unbranched carboxylic acids, that is to say the alkenyl carboxylic acid and/or a salt or anhydride thereof is preferably selected from the group of carboxylic acids consisting of pentenoic acid, hexenoic acid, heptenoic acid, octenoic acid, nonenoic acid, decenoic acid, undecenoic acid, dodecenoic acid, tridecenoic acid, myristoleic acid, pentadecenoic acid, palmitoleic acid, sapienic acid, heptadecenoic acid, oleic acid, elaidic acid, vaccenic acid, nonadecenoic acid, paullinic acid, gadoleic acid, gondoic acid, erucic acid, nervonic acid, their salts, their anhydrides and isomers and/or mixtures thereof.

In another embodiment of the present invention, the alkenyl carboxylic acid and/or a salt or anhydride thereof is selected from the group consisting of decenoic acid, dodecenoic acid, myristoleic acid, palmitoleic acid, oleic acid, paullinic acid, their salts, their anhydrides and isomers and/or mixtures thereof.

Preferably, the alkenyl carboxylic acid and/or a salt or anhydride thereof is oleic acid and/or an oleic acid salt or oleic anhydride.

According to another embodiment of the present invention, the surface treatment agent comprises at least one dicarboxylic acid and/or a salt or anhydride thereof.

It is appreciated that the expression "at least one" dicarboxylic acid and/or a salt or anhydride thereof means that one or more kinds of dicarboxylic acids and/or salts or anhydrides thereof may be provided in any aspect of the present invention.

According to a preferred embodiment of the present invention, the surface treatment agent comprises at least one mono-substituted succinic anhydride and/or mono-substituted succinic acid and/or a salt thereof.

It is appreciated that the expression "at least one" mono-substituted succinic anhydride means that one or more kinds of mono-substituted succinic anhydride may be provided in any aspect of the present invention.

Accordingly, it should be noted that the at least one mono-substituted succinic anhydride may be one kind of mono-substituted succinic anhydride. Alternatively, the at least one mono-substituted succinic anhydride may be a mixture of two or more kinds of mono-substituted succinic anhydride. For example, the at least one mono-substituted succinic anhydride may be a mixture of two or three kinds of mono-substituted succinic anhydride, like two kinds of mono-substituted succinic anhydride.

In one embodiment of the present invention, the at least one mono-substituted succinic anhydride is one kind of mono-substituted succinic anhydride.

It is appreciated that the at least one mono-substituted succinic anhydride represents a surface treatment agent and consists of succinic anhydride mono-substituted with a group selected from any linear, branched, aliphatic, and cyclic group having a total amount of carbon atoms from C2 to C30 in the substituent.

In one embodiment of the present invention, the at least one mono-substituted succinic anhydride consists of succinic anhydride mono-substituted with a group selected from a linear, branched, aliphatic, and cyclic group having a total amount of carbon atoms from C3 to C20 in the substituent. For example, the at least one mono-substituted succinic anhydride consists of succinic anhydride mono-substituted with a group selected from a linear, branched, aliphatic, and cyclic group having a total amount of carbon atoms from C4 to C18 in the substituent.

In one embodiment of the present invention, the at least one mono-substituted succinic anhydride consists of succinic anhydride mono-substituted with one group being a linear and aliphatic group having a total amount of carbon atoms from C2 to C30, preferably from C3 to C20 and most preferably from C4 to C18 in the substituent. Additionally or alternatively, the at least one mono-substituted succinic anhydride consists of succinic anhydride mono-substituted with one group being a branched and aliphatic group having a total amount of carbon atoms from C2 to C30, preferably from C3 to C20 and most preferably from C4 to C18 in the substituent.

Thus, it is preferred that the at least one mono-substituted succinic anhydride consists of succinic anhydride mono-substituted with one group being a linear or branched, alkyl group having a total amount of carbon atoms from C2 to C30, preferably from C3 to C20 and most preferably from C4 to C18 in the substituent.

For example, the at least one mono-substituted succinic anhydride consists of succinic anhydride mono-substituted with one group being a linear alkyl group having a total amount of carbon atoms from C2 to C30, preferably from C3 to C20 and most preferably from C4 to C18 in the substituent. Additionally or alternatively, the at least one mono-substituted succinic anhydride consists of succinic anhydride mono-substituted with one group being a branched alkyl group having a total amount of carbon atoms from C2 to C30, preferably from C3 to C20 and most preferably from C4 to C18 in the substituent.

In one embodiment of the present invention, the at least one mono-substituted succinic anhydride is at least one linear or branched alkyl mono-substituted succinic anhydride. For example, the at least one alkyl mono-substituted succinic anhydride is selected from the group comprising ethylsuccinic anhydride, propylsuccinic anhydride, butylsuccinic anhydride, triisobutyl succinic anhydride, pentylsuccinic anhydride, hexylsuccinic anhydride, heptylsuccinic anhydride, octylsuccinic anhydride, nonylsuccinic anhydride, decyl succinic anhydride, dodecyl succinic anhydride, hexadecanyl succinic anhydride, octadecanyl succinic anhydride, and mixtures thereof.

Accordingly, it is appreciated that, e.g., the term "butylsuccinic anhydride" comprises linear and branched butylsuccinic anhydride(s). One specific example of linear butylsuccinic anhydride(s) is n-butylsuccinic anhydride. Specific examples of branched butylsuccinic anhydride(s) are iso-butylsuccinic anhydride, sec-butylsuccinic anhydride and/or tert-butylsuccinic anhydride.

Furthermore, it is appreciated that, e.g., the term "hexadecanyl succinic anhydride" comprises linear and branched hexadecanyl succinic anhydride(s). One specific example of linear hexadecanyl succinic anhydride(s) is n-hexadecanyl succinic anhydride. Specific examples of branched hexadecanyl succinic anhydride(s) are 14-methylpentadecanyl succinic anhydride, 13-methylpentadecanyl succinic anhydride, 12-methylpentadecanyl succinic anhydride, 11-methylpentadecanyl succinic anhydride, 10-methylpentadecanyl succinic anhydride, 9-methylpentadecanyl succinic anhydride, 8-methylpentadecanyl succinic anhydride, 7-methylpentadecanyl succinic anhydride, 6-methylpentadecanyl succinic anhydride, 5-methylpentadecanyl succinic anhydride, 4-methylpentadecanyl succinic anhydride, 3-methylpentadecanyl succinic anhydride, 2-methylpentadecanyl succinic anhydride, 1-methylpentadecanyl succinic anhydride, 13-ethylbutadecanyl succinic anhydride, 12-ethylbutadecanyl succinic anhydride, 11-ethylbutadecanyl succinic anhydride, 10-ethylbutadecanyl succinic anhydride, 9-ethylbutadecanyl succinic anhydride, 8-ethylbutadecanyl succinic anhydride, 7-ethylbutadecanyl succinic anhydride, 6-ethylbutadecanyl succinic anhydride, 5-ethylbutadecanyl succinic anhydride, 4-ethylbutadecanyl succinic anhydride, 3-ethylbutadecanyl succinic anhydride, 2-ethylbutadecanyl succinic anhydride, 1-ethylbutadecanyl succinic anhydride, 2-butyldodecanyl succinic anhydride, 1-hexyldecanyl succinic anhydride, 1-hexyl-2-decanyl succinic anhydride, 2-hexyldecanyl succinic anhydride, 6,12-dimethylbutadecanyl succinic anhydride, 2,2-diethyldodecanyl succinic anhydride, 4,8,12-trimethyltridecanyl succinic anhydride, 2,2,4,6,8-pentamethylundecanyl succinic anhydride, 2-ethyl-4-methyl-2-(2-methylpentyl)-heptyl succinic anhydride and/or 2-ethyl-4,6-dimethyl-2-propylnonyl succinic anhydride.

Furthermore, it is appreciated that e.g. the term "octadecanyl succinic anhydride" comprises linear and branched octadecanyl succinic anhydride(s). One specific example of linear octadecanyl succinic anhydride(s) is n-octadecanyl succinic anhydride. Specific examples of branched hexadecanyl succinic anhydride(s) are 16-methylheptadecanyl succinic anhydride, 15-methylheptadecanyl succinic anhydride, 14-methylheptadecanyl succinic anhydride, 13-methylheptadecanyl succinic anhydride, 12-methylheptadecanyl succinic anhydride, 11-methylheptadecanyl succinic anhydride, 10-methylheptadecanyl succinic anhydride, 9-methylheptadecanyl succinic anhydride, 8-methylheptadecanyl succinic anhydride, 7-methylheptadecanyl succinic anhydride, 6-methylheptadecanyl succinic anhydride, 5-methylheptadecanyl succinic anhydride, 4-methylheptadecanyl succinic anhydride, 3-methylheptadecanyl succinic anhydride, 2-methylheptadecanyl succinic anhydride, 1-methylheptadecanyl succinic anhydride, 14-ethylhexadecanyl succinic anhydride, 13-ethylhexadecanyl succinic anhydride, 12-ethylhexadecanyl succinic anhydride, 11-ethylhexadecanyl succinic anhydride, 10-ethylhexadecanyl succinic anhydride, 9-ethylhexadecanyl succinic anhydride, 8-ethylhexadecanyl succinic anhydride, 7-ethylhexadecanyl succinic anhydride, 6-ethylhexadecanyl succinic anhydride, 5-ethylhexadecanyl succinic anhydride, 4-ethylhexadecanyl succinic anhydride, 3-ethylhexadecanyl succinic anhydride, 2-ethylhexadecanyl succinic anhydride, 1-ethylhexadecanyl succinic anhydride, 2-hexyldodecanyl succinic anhydride, 2-heptylundecanyl succinic anhydride, iso-octadecanyl succinic anhydride and/or 1-octyl-2-decanyl succinic anhydride.

In one embodiment of the present invention, the at least one alkyl mono-substituted succinic anhydride is selected from the group comprising butylsuccinic anhydride, hexylsuccinic anhydride, heptylsuccinic anhydride, octylsuccinic anhydride, hexadecanyl succinic anhydride, octadecanyl succinic anhydride, and mixtures thereof.

In one embodiment of the present invention, the at least one mono-substituted succinic anhydride is one kind of alkyl mono-substituted succinic anhydride. For example, the one alkyl mono-substituted succinic anhydride is butylsuccinic anhydride. Alternatively, the one alkyl mono-substituted succinic anhydride is hexylsuccinic anhydride. Alternatively, the one alkyl mono-substituted succinic anhydride is heptylsuccinic anhydride or octylsuccinic anhydride. Alternatively, the one alkyl mono-substituted succinic anhydride is hexadecanyl succinic anhydride. For example, the one alkyl mono-substituted succinic anhydride is linear hexadecanyl succinic anhydride such as n-hexadecanyl succinic anhydride or branched hexadecanyl succinic anhydride such as 1-hexyl-2-decanyl succinic anhydride. Alternatively, the one alkyl mono-substituted succinic anhydride is octadecanyl succinic anhydride. For example, the one alkyl mono-substituted succinic anhydride is linear octadecanyl succinic anhydride such as n-octadecanyl succinic anhydride or branched octadecanyl succinic anhydride such as iso-octadecanyl succinic anhydride or 1-octyl-2-decanyl succinic anhydride.

In one embodiment of the present invention, the one alkyl mono-substituted succinic anhydride is butylsuccinic anhydride such as n-butylsuccinic anhydride.

In one embodiment of the present invention, the at least one mono-substituted succinic anhydride is a mixture of two or more kinds of alkyl mono-substituted succinic anhydrides. For example, the at least one mono-substituted succinic anhydride is a mixture of two or three kinds of alkyl mono-substituted succinic anhydrides.

In a preferred embodiment of the present invention, the at least one mono-substituted succinic anhydride consists of succinic anhydride mono-substituted with one group being a linear or branched alkenyl group having a total amount of carbon atoms from C2 to C30, preferably from C3 to C20 and most preferably from C4 to C20 in the substituent.

In one embodiment of the present invention, the at least one mono-substituted succinic anhydride is at least one linear or branched alkenyl mono-substituted succinic anhydride. For example, the at least one alkenyl mono-substituted succinic anhydride is selected from the group comprising ethenylsuccinic anhydride, propenylsuccinic anhydride, butenylsuccinic anhydride, triisobutenyl succinic anhydride, pentenylsuccinic anhydride, hexenylsuccinic anhydride, heptenylsuccinic anhydride, octenylsuccinic anhydride, nonenylsuccinic anhydride, decenyl succinic anhydride, dodecenyl succinic anhydride, hexadecenyl succinic anhydride, octadecenyl succinic anhydride, and mixtures thereof.

Accordingly, it is appreciated that e.g. the term "hexadecenyl succinic anhydride" comprises linear and branched hexadecenyl succinic anhydride(s). One specific example of linear hexadecenyl succinic anhydride(s) is n-hexadecenyl succinic anhydride such as 14-hexadecenyl succinic anhydride, 13-hexadecenyl succinic anhydride, 12-hexadecenyl succinic anhydride, 11-hexadecenyl succinic anhydride, 10-hexadecenyl succinic anhydride, 9-hexadecenyl succinic anhydride, 8-hexadecenyl succinic anhydride, 7-hexadecenyl succinic anhydride, 6-hexadecenyl succinic anhydride, 5-hexadecenyl succinic anhydride, 4-hexadecenyl succinic anhydride, 3-hexadecenyl succinic anhydride and/or 2-hexadecenyl succinic anhydride. Specific examples of branched hexadecenyl succinic anhydride(s) are 14-methyl-9-pentadecenyl succinic anhydride, 14-methyl-2-pentadecenyl succinic anhydride, 1-hexyl-2-decenyl succinic anhydride and/or iso-hexadecenyl succinic anhydride.

Furthermore, it is appreciated that e.g. the term "octadecenyl succinic anhydride" comprises linear and branched octadecenyl succinic anhydride(s). One specific example of linear octadecenyl succinic anhydride(s) is n-octadecenyl succinic anhydride such as 16-octadecenyl succinic anhydride, 15-octadecenyl succinic anhydride, 14-octadecenyl succinic anhydride, 13-octadecenyl succinic anhydride, 12-octadecenyl succinic anhydride, 11-octadecenyl succinic anhydride, 10-octadecenyl succinic anhydride, 9-octadecenyl succinic anhydride, 8-octadecenyl succinic anhydride, 7-octadecenyl succinic anhydride, 6-octadecenyl succinic anhydride, 5-octadecenyl succinic anhydride, 4-octadecenyl succinic anhydride, 3-octadecenyl succinic anhydride and/or 2-octadecenyl succinic anhydride. Specific examples of branched octadecenyl succinic anhydride(s) are 16-methyl-9-heptadecenyl succinic anhydride, 16-methyl-7-heptadecenyl succinic anhydride, 1-octyl-2-decenyl succinic anhydride and/or iso-octadecenyl succinic anhydride.

In one embodiment of the present invention, the at least one alkenyl mono-substituted succinic anhydride is selected from the group comprising hexenylsuccinic anhydride, octenylsuccinic anhydride, hexadecenyl succinic anhydride, octadecenyl succinic anhydride, and mixtures thereof.

In one embodiment of the present invention, the at least one mono-substituted succinic anhydride is one alkenyl mono-substituted succinic anhydride. For example, the one alkenyl mono-substituted succinic anhydride is hexenylsuccinic anhydride. Alternatively, the one alkenyl mono-substituted succinic anhydride is octenylsuccinic anhydride. Alternatively, the one alkenyl mono-substituted succinic anhydride is hexadecenyl succinic anhydride. For example, the one alkenyl mono-substituted succinic anhydride is a linear hexadecenyl succinic anhydride such as n-hexadecenyl succinic anhydride or branched hexadecenyl succinic anhydride such as 1-hexyl-2-decenyl succinic anhydride. Alternatively, the one alkenyl mono-substituted succinic anhydride is octadecenyl succinic anhydride. For example, the one alkyl mono-substituted succinic anhydride is linear octadecenyl succinic anhydride such as n-octadecenyl succinic anhydride or branched octadecenyl succinic anhydride such iso-octadecenyl succinic anhydride, or 1-octyl-2-decenyl succinic anhydride.

In one embodiment of the present invention, the one alkenyl mono-substituted succinic anhydride is linear octadecenyl succinic anhydride such as n-octadecenyl succinic anhydride. In another embodiment of the present invention, the one alkenyl mono-substituted succinic anhydride is linear octenylsuccinic anhydride such as n-octenylsuccinic anhydride.

In one embodiment of the present invention, the at least one mono-substituted succinic anhydride is a mixture of two or more kinds of alkenyl mono-substituted succinic anhydrides. For example, the at least one mono-substituted succinic anhydride is a mixture of two or three kinds of alkenyl mono-substituted succinic anhydrides.

If the at least one mono-substituted succinic anhydride is a mixture of two or more kinds of alkenyl mono-substituted succinic anhydrides, one alkenyl mono-substituted succinic anhydride is linear or branched octadecenyl succinic anhydride, while each further alkenyl mono-substituted succinic anhydride is selected from ethenylsuccinic anhydride, propenylsuccinic anhydride, butenylsuccinic anhydride, pentenylsuccinic anhydride, hexenylsuccinic anhydride, heptenylsuccinic anhydride, nonenylsuccinic anhydride, hexadecenyl succinic anhydride and mixtures thereof. For example, the at least one mono-substituted succinic anhydride is a mixture of two or more kinds of alkenyl mono-substituted succinic anhydrides, wherein one alkenyl mono-substituted succinic anhydride is linear octadecenyl succinic anhydride and each further alkenyl mono-substituted succinic anhydride is selected from ethenylsuccinic anhydride, propenylsuccinic anhydride, butenylsuccinic anhydride, pentenylsuccinic anhydride, hexenylsuccinic anhydride, heptenylsuccinic anhydride, nonenylsuccinic anhydride, hexadecenyl succinic anhydride and mixtures thereof. Alternatively, the at least one mono-substituted succinic anhydride is a mixture of two or more kinds of alkenyl mono-substituted succinic anhydrides, wherein one alkenyl mono-substituted succinic anhydride is branched octadecenyl succinic anhydride and each further alkenyl mono-substituted succinic anhydride is selected from ethenylsuccinic anhydride, propenylsuccinic anhydride, butenylsuccinic anhydride, pentenylsuccinic anhydride, hexenylsuccinic anhydride, heptenylsuccinic anhydride, nonenylsuccinic anhydride, hexadecenyl succinic anhydride and mixtures thereof.

For example, the at least one mono-substituted succinic anhydride is a mixture of two or more kinds of alkenyl mono-substituted succinic anhydrides comprising one or more hexadecenyl succinic anhydride, like linear or branched hexadecenyl succinic anhydride(s), and one or more octadecenyl succinic anhydride, like linear or branched octadecenyl succinic anhydride(s).

In one embodiment of the present invention, the at least one mono-substituted succinic anhydride is a mixture of two or more kinds of alkenyl mono-substituted succinic anhydrides comprising linear hexadecenyl succinic anhydride(s) and linear octadecenyl succinic anhydride(s). Alternatively, the at least one mono-substituted succinic anhydride is a mixture of two or more kinds of alkenyl mono-substituted succinic anhydrides comprising branched hexadecenyl succinic anhydride(s) and branched octadecenyl succinic anhydride(s). For example, the one or more hexadecenyl succinic anhydride is linear hexadecenyl succinic anhydride like n-hexadecenyl succinic anhydride and/or branched hexadecenyl succinic anhydride like 1-hexyl-2-decenyl succinic anhydride. Additionally or alternatively, the one or more octadecenyl succinic anhydride is linear octadecenyl succinic anhydride like n-octadecenyl succinic anhydride and/or branched octadecenyl succinic anhydride like iso-octadecenyl succinic anhydride and/or 1-octyl-2-decenyl succinic anhydride.

If the at least one mono-substituted succinic anhydride is a mixture of two or more kinds of alkenyl mono-substituted succinic anhydrides, it is appreciated that one alkenyl mono-substituted succinic anhydride is present in an amount of from 20 to 60 wt.-% and preferably of from 30 to 50 wt.-%, based on the total weight of the at least one mono-substituted succinic anhydride provided.

For example, if the at least one mono-substituted succinic anhydride is a mixture of two or more kinds of alkenyl mono-substituted succinic anhydrides comprising one or more hexadecenyl succinic anhydride(s), like linear or branched hexadecenyl succinic anhydride(s), and one or more octadecenyl succinic anhydride(s), like linear or branched hexadecenyl succinic anhydride(s), it is preferred that the one or more octadecenyl succinic anhydride(s) is present in an amount of from 20 to 60 wt.-% and preferably of from 30 to 50 wt.-%, based on the total weight of the at least one mono-substituted succinic anhydride.

It is also appreciated that the at least one mono-substituted succinic anhydride may be a mixture of at least one alkyl mono-substituted succinic anhydrides and at least one alkenyl mono-substituted succinic anhydrides.

If the at least one mono-substituted succinic anhydride is a mixture of at least one alkyl mono-substituted succinic anhydrides and at least one alkenyl mono-substituted succinic anhydrides, it is appreciated that the alkyl substituent of the at least one alkyl mono-substituted succinic anhydrides and the alkenyl substituent of the at least one alkenyl mono-substituted succinic anhydrides are preferably the same. For example, the at least one mono-substituted succinic anhydride is a mixture of ethylsuccinic anhydride and ethenylsuccinic anhydride. Alternatively, the at least one mono-substituted succinic anhydride is a mixture of propylsuccinic anhydride and propenylsuccinic anhydride. Alternatively, the at least one mono-substituted succinic anhydride is a mixture of butylsuccinic anhydride and butenylsuccinic anhydride. Alternatively, the at least one mono-substituted succinic anhydride is a mixture of triisobutyl succinic anhydride and triisobutenyl succinic anhydride. Alternatively, the at least one mono-substituted succinic anhydride is a mixture of pentylsuccinic anhydride and pentenylsuccinic anhydride. Alternatively, the at least one mono-substituted succinic anhydride is a mixture of hexylsuccinic anhydride and hexenylsuccinic anhydride. Alternatively, the at least one mono-substituted succinic anhydride is a mixture of heptylsuccinic anhydride and heptenylsuccinic anhydride. Alternatively, the at least one mono-substituted succinic anhydride is a mixture of octylsuccinic anhydride and octenylsuccinic anhydride. Alternatively, the at least one mono-substituted succinic anhydride is a mixture of nonylsuccinic anhydride and nonenylsuccinic anhydride. Alternatively, the at least one mono-substituted succinic anhydride is a mixture of decyl succinic anhydride and decenyl succinic anhydride.

Alternatively, the at least one mono-substituted succinic anhydride is a mixture of dodecyl succinic anhydride and dodecenyl succinic anhydride. Alternatively, the at least one mono-substituted succinic anhydride is a mixture of hexadecanyl succinic anhydride and hexadecenyl succinic anhydride. For example, the at least one mono-substituted succinic anhydride is a mixture of linear hexadecanyl succinic anhydride and linear hexadecenyl succinic anhydride or a mixture of branched hexadecanyl succinic anhydride and branched hexadecenyl succinic anhydride. Alternatively, the at least one mono-substituted succinic anhydride is a mixture of octadecanyl succinic anhydride and octadecenyl succinic anhydride. For example, the at least one mono-substituted succinic anhydride is a mixture of linear octadecanyl succinic anhydride and linear octadecenyl succinic anhydride or a mixture of branched octadecanyl succinic anhydride and branched octadecenyl succinic anhydride.

In one embodiment of the present invention, the at least one mono-substituted succinic anhydride is a mixture of nonylsuccinic anhydride and nonenylsuccinic anhydride.

If the at least one mono-substituted succinic anhydride is a mixture of at least one alkyl mono-substituted succinic anhydrides and at least one alkenyl mono-substituted succinic anhydrides, the weight ratio between the at least one alkyl mono-substituted succinic anhydride and the at least one alkenyl mono-substituted succinic anhydride is between 90:10 and 10:90 (wt.-%/wt.-%). For example, the weight ratio between the at least one alkyl mono-substituted succinic anhydride and the at least one alkenyl mono-substituted succinic anhydride is between 70:30 and 30:70 (wt.-%/wt.-%) or between 60:40 and 40:60 (wt.-%/wt.-%).

It is appreciated that the at least one mono-substituted succinic anhydride may be provided in the process of the present invention in combination with at least one mono-substituted succinic acid and/or a salt thereof. Alternatively, the surface treatment agent may comprise at least one mono-substituted succinic acid and/or a salt thereof.

Accordingly, it should be noted that the at least one mono-substituted succinic acid and/or a salt thereof may be one kind of mono-substituted succinic acid and/or a salt thereof. Alternatively, the at least one mono-substituted succinic acid may be a mixture of two or more kinds of mono-substituted succinic acid and/or a salt thereof. For example, the at least one mono-substituted succinic acid and/or a salt thereof may be a mixture of two or three kinds of mono-substituted succinic acids and/or salts thereof, like two kinds of mono-substituted succinic acids and/or salts thereof.

In one embodiment of the present invention, the at least one mono-substituted succinic acid and/or a salt thereof is one kind of mono-substituted succinic acid and/or a salt thereof.

It is appreciated that the at least one mono-substituted succinic acid and/or a salt thereof represents a surface treatment agent and consists of succinic acid and/or its salt mono-substituted with a group selected from any linear, branched, aliphatic and cyclic group having a total amount of carbon atoms from C2 to C30 in the substituent.

In one embodiment of the present invention, the at least one mono-substituted succinic acid and/or a salt thereof consists of succinic acid and/or its salt mono-substituted with a group selected from a linear, branched, aliphatic and cyclic group having a total amount of carbon atoms from C3 to C20 in the substituent. For example, the at least one mono-substituted succinic acid and/or a salt thereof consists of succinic acid and/or its salt mono-substituted with a group selected from a linear, branched, aliphatic and cyclic group having a total amount of carbon atoms from C4 to C18 in the substituent.

It is appreciated that the at least one mono-substituted succinic anhydride and the at least one mono-substituted succinic acid and/or a salt thereof may comprise the same or different substituent.

In one embodiment of the present invention, the succinic acid molecule and/or its salt of the at least one mono-substituted succinic acid and/or a salt thereof and the succinic anhydride molecule of the at least one mono-substituted succinic anhydride are mono-substituted with the same group selected from any linear, branched, aliphatic and cyclic group having a total amount of carbon atoms from C2 to C30, preferably from C3 to C20 and most preferably from C4 to C18 in the substituent.

If the at least one mono-substituted succinic anhydride is provided in combination with at least one mono-substituted succinic acid and/or a salt thereof, the at least one mono-substituted succinic acid is present in an amount of ≤10 mol.-%, based on the molar sum of the at least one mono-substituted succinic anhydride and the at least one mono-substituted succinic acid and/or its salt. For example, the at least one mono-substituted succinic acid is present in an amount of ≤5 mol.-%, preferably of ≤2.5 mol.-% and most preferably of ≤1 mol.-%, based on the molar sum of the at least one mono-substituted succinic anhydride and the at least one mono-substituted succinic acid and/or its salt.

Additionally or alternatively, the at least one mono-substituted succinic acid is provided in a blend together with the at least one mono-substituted succinic anhydride.

In a particularly preferred embodiment, the surface-treatment layer is formed by contacting the calcium carbonate-containing filler material with a mixture of alkenyl succinic anhydrides and/or alkenyl succinic acids, wherein the alkenyl succinic anhydrides and/or alkenyl succinic acids are mono-substituted with a group selected from any linear or branched mono-alkenyl group having a total amount of carbon atoms from C12 to C20, preferably from C15 to C20. In this case, the alkenyl succinic anhydride will typically comprise at least 80 wt.-% of the mixture, based on the total weight of the mixture, preferably at least 85 wt.-%, more preferably at least 90 wt.-% and most preferably at least 93 wt.-%.

Calcium carbonate-containing filler materials surface-treated with mono-substituted succinic acids and methods for the production thereof are described in WO 2014/060286 A1, WO 2014/128087 A1, and WO 2016/087286 A1.

For example, the surface-treated calcium carbonate-containing material may have a weight median particle size ($d_{50}$) value in the range from 0.1 µm to 7 µm, a top cut ($d_{98}$) value of 15 µm or less, and a surface-treatment layer formed by contacting the calcium carbonate-containing filler material with a mixture of alkenyl succinic anhydrides and/or alkenyl succinic acids, wherein the alkenyl succinic anhydrides and/or alkenyl succinic acids are mono-substituted with a group selected from any linear or branched mono-alkenyl group having a total amount of carbon atoms from C12 to C20, preferably from C15 to C20. In this case, the alkenyl succinic anhydride will typically comprise at least 80 wt.-% of the mixture, based on the total weight of the mixture, preferably at least 85 wt.-%, more preferably at least 90 wt.-% and most preferably at least 93 wt.-%.

Accordingly, it is preferred that the surface-treated calcium carbonate-containing filler material comprises a calcium carbonate-comprising filler material having a median particle size diameter $d_{50}$ value from 0.25 µm to 5 µm, preferably from 0.5 to 4 µm, more preferably from 1.0 µm to 3.5 µm, a top cut ($d_{98}$) of 10 µm, more preferably of 7.5 µm, and a BET specific surface area of from 0.5 to 50 m²/g, preferably of from 0.5 to 35 m²/g and most preferably of from 0.5 to 15 m²/g, measured using nitrogen and the BET method according to ISO 9277:2010, and a surface-treatment layer on at least a part of the surface of said calcium carbonate-containing filler material, wherein the surface-treatment layer is formed by contacting the calcium carbonate-containing filler material with a surface treatment agent in an amount from 0.1 to 3 wt.-%, based on the total dry weight of the calcium carbonate-containing filler material, and wherein the surface treatment agent comprises at least one mono-substituted succinic anhydride, preferably a mixture of alkenyl succinic anhydrides and/or alkenyl succinic acids, wherein the alkenyl succinic anhydrides and/or alkenyl succinic acids are mono-substituted with a group selected from any linear or branched mono-alkenyl group having a total amount of carbon atoms from C12 to C20, preferably from C15 to C20. In this case, the alkenyl succinic anhydride will typically comprise at least 80 wt.-% of the mixture, based on the total weight of the mixture, preferably at least 85 wt.-%, more preferably at least 90 wt.-% and most preferably at least 93 wt.-%.

The Surface-Treatment Layer

It is to be understood that the surface-treatment layer of the surface-treated calcium carbonate-containing filler material is formed by contacting the calcium carbonate-containing filler material with a surface treatment agent. That is, a chemical reaction may take place between the calcium carbonate-containing filler material and the surface treatment agent. In other words, the surface-treatment layer may comprise the surface treatment agent and/or salty reaction products thereof.

For example, if the surface-treatment layer is formed by contacting the calcium carbonate-containing filler material with at least one monocarboxylic acid and/or a salt or anhydride thereof, the surface-treatment layer may further comprise a salt formed from the reaction of the at least one monocarboxylic acid and/or at least one monocarboxylic anhydride with the calcium carbonate-containing filler material. Likewise, if the surface-treatment layer is formed by contacting the calcium carbonate-containing filler material with stearic acid, the surface-treatment layer may further comprise a salt formed from the reaction of stearic acid with the calcium carbonate-containing filler material. Analogous reactions may take place when using alternative surface treatment agents according to the present invention.

According to one embodiment the salty reaction product(s) of the mono-substituted succinic acid and/or the at least one mono-substituted succinic anhydride are one or more calcium and/or magnesium salts thereof.

According to one embodiment the salty reaction product(s) of the mono-substituted succinic acid and/or the at least one mono-substituted succinic anhydride formed on at least a part of the surface of the calcium carbonate-comprising filler material are one or more calcium salts and/or one or more magnesium salts thereof.

According to one embodiment the molar ratio of the at least one mono-substituted succinic anhydride and the optional at least one mono-substituted succinic acid to the salty reaction product(s) thereof is from 99.9:0.1 to 0.1:99.9, preferably from 70:30 to 90:10.

According to one embodiment of the present invention, the surface-treated calcium carbonate-containing filler material comprises, and preferably consists of, calcium carbonate-comprising filler material and a treatment layer comprising at least one mono-substituted succinic anhydride and/or at least one mono-substituted succinic acid and/or salty reaction product(s) thereof. The treatment layer is formed on at least a part of the surface, preferably on the whole surface, of said calcium carbonate-comprising filler material.

In case the treatment layer on the surface of the calcium carbonate-comprising filler material comprises at least one mono-substituted succinic acid, it is preferred that the at least one mono-substituted succinic acid is formed from the applied at least one mono-substituted succinic anhydride. That is to say, the substituent of the at least one mono-substituted succinic acid and the substituent of the at least one mono-substituted succinic anhydride are the same.

In one embodiment of the present invention, the treatment layer formed on the surface of the calcium carbonate-comprising filler material comprises the at least one mono-substituted succinic anhydride and at least one mono-substituted succinic acid or salty reaction product(s) thereof obtained from contacting the calcium carbonate-comprising filler material with the at least one mono-substituted succinic anhydride and the optional at least one mono-substituted succinic acid. Alternatively, the treatment layer formed on the surface of the calcium carbonate-comprising filler material comprises the at least one mono-substituted succinic anhydride and at least one mono-substituted succinic acid and salty reaction product(s) thereof obtained from contacting the calcium carbonate-comprising filler material with the at least one mono-substituted succinic anhydride and the optional at least one mono-substituted succinic acid.

The First Polypropylene Polymer

The inventive process, the inventive product, the inventive use, and the inventive article make use of a first polypropylene polymer. In the process of the present invention, the first polypropylene polymer is compounded with the surface-treated calcium carbonate-containing filler material provided in step a) to form a masterbatch, as will be described in detail below.

It is appreciated that the first polypropylene polymer is an isotactic polypropylene homopolymer having a melt flow rate MFR of 15 to 40 g/10 min, as measured according to ISO1133:2011 at 230° C. under a load of 2.16 kg.

Polypropylene homopolymers having the desired tacticity may be synthesized, e.g., by suitable Ziegler-Natta polymerization catalysts or metallocene polymerization catalysts known to the person skilled in the art.

In one embodiment of the present invention, the first polypropylene polymer has a MFR of 20 to 35 g/10 min, preferably 25 to 35 g/10 min, as measured according to ISO1133:2011 at 230° C. under a load of 2.16 kg.

The inventors surprisingly found that the choice of an isotactic polypropylene homopolymer having a melt flow rate (MFR) as claimed, allows for the efficient dispersion of the surface-treated calcium carbonate containing filler material in the polymer matrix during compounding step d) of the present invention, as will be outlined below. Furthermore, the first polypropylene polymer is selected for its good processability in fiber formation step f).

Furthermore, it is appreciated that the isotactic polypropylene homopolymer for use in the present invention preferably has a polydispersity index ($M_w/M_n$) of less than 7, preferably less than 4.

It is appreciated that the first polypropylene polymer is suitable for compounding with the surface-treated calcium carbonate-comprising filler material as specified above to form a masterbatch, wherein the masterbatch comprises the surface-treated calcium carbonate-containing filler material in an amount of 60 wt.-% to 75 wt.-%, preferably 65 wt.-% to 74 wt.-%, more preferably 68 wt.-% to 72 wt.-%, based on the total weight of the masterbatch.

The Second Polypropylene Polymer

The inventive process, the inventive product, the inventive use, and the inventive article make use of a second polypropylene polymer.

It is appreciated that the second polypropylene polymer is an isotactic polypropylene homopolymer having a melt flow rate MFR of 15 to 40 g/10 min, as measured according to ISO1133:2011 at 230° C. under a load of 2.16 kg.

Polypropylene homopolymers having the desired tacticity may be synthesized, e.g., by suitable Ziegler-Natta polymerization catalysts or metallocene polymerization catalysts known to the person skilled in the art.

In one embodiment of the present invention, the second polypropylene polymer has a MFR of 20 to 35 g/10 min, preferably 25 to 35 g/10 min, as measured according to ISO1133:2011 at 230° C. under a load of 2.16 kg.

The inventors surprisingly found that the choice of an isotactic polypropylene homopolymer having a melt flow rate (MFR) as specified, allows for the efficient dispersion of the surface-treated calcium carbonate containing filler material in the polymer matrix during compounding step d) of the present invention, as will be outlined below. Furthermore, the second polypropylene polymer is selected for its good processability in fiber formation step f).

Furthermore, it is appreciated that the isotactic polypropylene homopolymer for use in the present invention preferably has a narrow molecular weight distribution.

Suitable isotactic polypropylene homopolymers for use as the second polypropylene polymer of the present invention are known to the skilled person. According to one embodiment of the present invention, the first polypropylene polymer and the second polypropylene polymer may be the same polymer. However, the first polypropylene polymer and the second polypropylene polymer may also be different polymers.

Process for Producing a Nonwoven Fabric

According to the first aspect of the present invention, a process for producing a nonwoven fabric is provided. The inventive process makes use of the surface-treated calcium carbonate-containing filler material, the first polypropylene polymer and the second polypropylene polymer as described hereinabove.

a) The Surface-Treated Calcium Carbonate-Containing Filler Material

According to step a) of the process of the present invention, a surface-treated calcium carbonate-containing filler material as described above is provided.

b) The First Polypropylene Polymer

According to step b) of the process of the present invention, a first polypropylene polymer as described above is provided.

c) The Second Polypropylene Polymer

According to step c) of the process of the present invention, a second polypropylene polymer as described above is provided.

d) Masterbatch Compounding

According to step d) of the process of the present invention, a masterbatch is formed by compounding the surface-treated calcium carbonate-containing filler material of step a) in an amount of 60 wt.-% to 75 wt.-%, based on the total weight of the masterbatch, with the first polypropylene polymer of step b).

The compounding step d) may be performed by any compounding method known to the skilled person. Preferably, compounding is performed by a kneading process, wherein a premix of the surface-treated calcium carbonate-containing filler material of step a) and the first polypropylene homopolymer of step b) is continuously fed to an extruder, such as a single screw or twin screw extruder. The extruder is heated to a temperature sufficiently high to allow for efficient mixing of the surface-treated calcium carbonate-containing filler material and the first polypropylene homopolymer. A suitable temperature range is 180 to 250° C.

Alternatively, the surface-treated calcium carbonate-containing filler material may be added during compounding to the at least partially molten first polypropylene homopolymer, e.g., at any split-feed inlet port along the kneading screw of the extruder.

During masterbatch compounding step d), optionally one or more additives, which are well known to the skilled person, may be added to the mixture in an amount of up to 5 wt.-%, preferably up to 2 wt.-%, based on the total weight of the masterbatch. Such additives comprise, without being limited to, UV-absorbers, light stabilizers, processing stabilizers, antioxidants, heat stabilizers, nucleating agents, metal deactivators, impact modifiers, plasticizers, lubricants, rheology modifiers, processing aids, pigments, dyes, optical brighteners, antimicrobials, antistatic agents, slip agents, anti-block agents, coupling agents, dispersants, compatibilizers, oxygen scavengers, acid scavengers, markers, anti-fogging agents, surface modifiers, flame retardants, blowing agents, smoke suppressors, or mixtures of the foregoing additives. Preferred pigments are titanium dioxide as white pigment and color pigments, such as blue, green and red pigments. The additives may be provided in pure form, in dissolved form or in form of a masterbatch. However, it should be understood that preferably no further or other filler materials are added during masterbatch compounding step d).

The masterbatch may be obtained as a material having a defined shape, such as pellets, spheres, pearls, beads, prills, flakes, chips or slugs, or a non-defined shape, such as, for example, crumbles. Alternatively, the polymer composition may be a mixture of both defined and non-defined shape materials.

Preferably, a pelletizing step is performed after the kneading process to provide the masterbatch in the form of pellets.

In another embodiment of the present invention, the masterbatch is formed in step d) by compounding the surface-treated calcium carbonate-containing filler material of step a) in an amount of 65 wt.-% to 74 wt.-%, preferably 68 wt.-% to 72 wt.-%, based on the total weight of the masterbatch, with the first polypropylene polymer of step b).

The masterbatch comprises the surface-treated calcium carbonate-containing filler material in an amount of from 60 to 75 wt.-%, preferably from 65 to 84 wt.-% and more preferably from 68 to 72 wt.-%, based on the total weight of the masterbatch. It has been found that in the masterbatch, the surface-treated calcium carbonate-containing filler material is uniformly dispersed in the first polypropylene polymer. Higher concentrations of the surface-treated calcium carbonate-containing filler material in the masterbatch may lead to poor dispersion of the filler material, which may lead to processing problems during fiber spinning, such as filament ruptures and die build-up, and/or may result in a final nonwoven material lacking the required mechanical strength characteristics. On the other hand, if a masterbatch of lower concentration is provided, the masterbatch has to be admixed to the second polypropylene polymer in substantially higher amounts, leading to decreased flexibility in tailoring the properties of the nonwoven fabric by adjusting its composition.

In a further embodiment of the present invention, the masterbatch obtained in compounding step d) consists of the surface-treated calcium carbonate-containing filler material of step a) and the first polypropylene polymer of step b).

In an exemplary embodiment of the present invention, the masterbatch is formed in step d) by compounding the surface-treated calcium carbonate-containing filler material of step a) in an amount of 65 wt.-% to 74 wt.-%, preferably 68 wt.-% to 72 wt.-%, based on the total weight of the masterbatch, with the first polypropylene polymer of step b), wherein the surface-treated calcium carbonate-containing filler material comprises a surface-treatment layer, wherein the surface-treatment layer is formed by contacting a calcium carbonate-containing filler material with a surface treatment agent in an amount from 0.1 to 3 wt.-%, based on the total dry weight of the calcium carbonate-containing filler material, and wherein the surface treatment agent comprises at least one mono-substituted succinic anhydride. In this embodiment, the first polypropylene polymer may have a MFR of 20 to 35 g/10 min, preferably 25 to 35 g/10 min, as measured according to ISO1133:2011 at 230° C. under a load of 2.16 kg.

e) Mixing of Masterbatch and Second PP Polymer

According to step e) of the process of the present invention, the masterbatch of step d) is mixed with the second polypropylene polymer of step c) to obtain a mixture having a surface-treated calcium carbonate-containing filler material content in the range of 5 wt.-% to 15 wt.-%, based on the total weight of the mixture.

Mixing step e) may be performed by any means known to the skilled person, including, but not limited to, blending, extruding, kneading, and high-speed mixing. Preferably, mixing step e) is performed by extruding the masterbatch of step d) and the second polypropylene polymer of step c).

It is appreciated that the mixture obtained in step e) of the present invention comprises the surface-treated calcium carbonate-containing filler material in a range of 5 wt.-% to 15 wt.-%, based on the total weight of the mixture. The inventors found that, if the nonwoven fabric is formed from a mixture containing the surface-treated calcium carbonate-containing filler material in the range of 5 wt.-% to 15 wt.-%, based on the total weight of the mixture, the process for the production of the nonwoven fabric may be performed essentially without fiber breakage or spinneret clogging during fiber spinning, and the process allows for producing the nonwoven fabric with the desired tactile, haptic and mechanical properties at acceptable costs under the specified fiber formation conditions.

In a further embodiment of the present invention, the mixture obtained in step e) of the present invention comprises the surface-treated calcium carbonate-containing filler material content in a range of 7 wt.-% to 12 wt.-%, preferably 8 to 11.5 wt.-%, based on the total weight of the mixture.

During mixing step e), optionally one or more additives, which are well known to the skilled person, may be added to the mixture in an amount of up to 5 wt.-%, preferably up to 2 wt.-%, based on the total weight of the mixture. Such additives comprise, without being limited to, UV-absorbers, light stabilizers, processing stabilizers, antioxidants, heat stabilizers, nucleating agents, metal deactivators, impact modifiers, plasticizers, lubricants, rheology modifiers, processing aids, pigments, dyes, optical brighteners, antimicrobials, antistatic agents, slip agents, anti-block agents, coupling agents, dispersants, compatibilizers, oxygen scavengers, acid scavengers, markers, antifogging agents, surface modifiers, flame retardants, blowing agents, smoke suppressors, or mixtures of the foregoing additives. Preferred pigments are titanium dioxide as white pigment and color pigments, such as blue, green and red pigments. The additives may be provided in pure form, in dissolved form or in form of a masterbatch. For example, the additives may be incorporated in and provided with the masterbatch of step d). However, it should be understood that preferably no further or other filler materials are added during mixing step e).

In an exemplary embodiment, the mixture of step e) consists essentially of the surface-treated calcium carbonate-containing filler material of step a) in an amount of 5 wt.-% to 15 wt.-%, preferably 7 wt.-% to 12 wt.-%, more preferably 8 to 11.5 wt.-%, based on the total weight of the mixture, the first polypropylene polymer of step b) and the second polypropylene polymer of step c), and optionally one or more additives in an amount of up to 5 wt.-%, preferably up to 2 wt.-%, based on the total weight of the mixture.

In another exemplary embodiment, the mixture of step e) consists essentially of the surface-treated calcium carbonate-containing filler material of step a) in an amount of 5 wt.-% to 15 wt.-%, preferably 7 wt.-% to 12 wt.-%, more preferably 8 to 11.5 wt.-%, based on the total weight of the mixture, the first polypropylene polymer of step b) and the second polypropylene polymer of step c), and optionally one or more additives selected from the group consisting of UV-absorbers, processing aids, pigments, such as titanium dioxide as white pigment and color pigments, such as blue, green and red pigments, dyes, optical brighteners, antimicrobials, antistatic agents, and flame retardants in an amount of up to 5 wt.-%, preferably up to 2 wt.-%, based on the total weight of the mixture.

f) Fiber Formation

According to step f) of the process of the present invention, the mixture of step e) is formed into fibers having an average fiber diameter in the range from 11 to 30 μm or in the range from 15 to 35 μm.

Appropriate method conditions for preparing staple fibers and/or filaments are commonly known to the skilled person and/or can be established by routine modifications based on common general knowledge.

The cross-section of the filaments and/or staple fibers may have a great variety of shapes. It is preferred that the cross-sectional shape of the filaments and/or staple fibers may be round, oval or n-gonal, wherein n is 3, e.g. n is 3. For example, the cross-sectional shape of the filaments and/or staple fibers is round or trilobal, like round. Additionally or alternatively, the cross-sectional shape of the filaments and/or staple fibers is hollow.

It is appreciated that the filaments and/or staple fibers may be prepared by all techniques known in the art used for preparing such filaments and/or staple fibers. For example, the filaments and/or staple fibers of the present invention can be prepared by the well-known melt-blown process, spunbonded process or staple fiber production.

In accordance with known technology such as the continuous filament spinning for filaments or staple fibers, and nonwoven processes such as spunbond production and meltblown production, the fibers and filaments can be formed by extrusion of the molten polymer through small orifices of a spinneret. In general, the fibers or filaments thus formed are then drawn or elongated to induce molecular orientation and affect crystallinity, resulting in a reduction in diameter and an improvement in physical properties.

Spunmelt is a generic term describing the manufacturing of nonwoven materials directly from thermoplastic polymer compositions. It encompasses 2 processes (spunlaid and meltblown) and the combination of both. In this process polymer granules are melted and molten polymer is extruded through a spinneret assembly which creates a plurality of continuous polymeric filaments. The filaments are then quenched and drawn by an air flow, and collected to form a nonwoven fabric.

The spunlaid process (also known as spunbonded) has the advantage of giving nonwovens greater strength. Co-extrusion of second components is used in several spunlaid processes, usually to provide extra properties or bonding capabilities. In meltblown web formation, low viscosity polymers are extruded into a high velocity airstream on leaving the spinneret. This scatters the melt, solidifies it and breaks it up into a fibrous web.

Processes are well known in the art, and are commercially available, for producing spunlaid fabrics. Typical processes are known, such as the LUTRAVIL, DOCAN, REIFENHÄUSER, or ASON process. The extrusion of molten polymer through spinneret orifices is followed by the newly formed extruded filaments being quenched with air and drawn by suction and being disbursed on a conveyor belt to form a nonwoven fabric.

According to one embodiment of the present invention, the mixture of step e) is formed into fibers by combining a melt blown process and a spunbond process as described above.

It is appreciated that the steps e) and f) of the process of the present invention may be performed at the same time. For example, if mixing step e) is performed by extruding the masterbatch of step d) and the second polypropylene polymer of step c), the molten mixture may be directly extruded through small orifices of a spinneret to form the fibers in the spunlaid or meltblown process or a combination of both.

In another embodiment of the present invention, the mixture of step e) is formed into filaments by the spunlaid process, as described above. In this embodiment, filament diameters range from 11 to 30 µm, preferably 14 to 30 µm, more preferably 14 to 25 µm, or from 15 to 30 µm, and most preferably from 15 to 25 µm. The skilled person will appreciate that the filament diameter may be adjusted by choosing a spinneret having an appropriate hole diameter and a suitable drawing ratio. Accordingly, the filaments will show a titer in the range of 1 to 6 dtex, preferably 1.5 to 4 dtex.

In one embodiment of the present invention, the mixture of step e) is formed into staple fibers according to a two-step or a one-step process. The staple fibers may be produced from filaments, obtained as described above, and optionally crimped. The filaments are then cut into staple fibers of a defined length. In this embodiment, filament diameters range from 11 to 30 µm, preferably 14 to 30 µm, more preferably 14 to 25 µm, or from 15 to 30 µm, and most preferably from 15 to 25 µm. The skilled person will appreciate that the staple fiber diameter may be adjusted by choosing a spinneret having an appropriate hole diameter and a suitable drawing ratio for the production of the filaments, which are then formed into staple fibers. Accordingly, the staple fibers will show a titer in the range of 1 to 6 dtex, preferably 1.5 to 4 dtex. Furthermore, the staple fibers have a staple length in the range of 30 to 90 mm, and preferably 40 to 60 mm. The staple length is adjusted by appropriately adjusting the process conditions of the cutting step. Optionally, the staple fibers may be assembled into bales.

g) Fibrous Web Formation

According to step g) of the process of the present invention, the fibers of step f) are formed into a fibrous web.

Appropriate method conditions for preparing fibrous webs are commonly known to the skilled person and/or can be established by routine modifications based on common general knowledge. For example, fibrous webs may be prepared by drylaying techniques, such as carding or airlaying, or by wetlaying of staple fibres, or by spunlaying of the continuous filaments. Although these methods may cause some of the filaments or fibers to adhere to one another, this cannot be regarded as the principal method of bonding.

In another exemplary embodiment of the present invention, staple fibers obtained in step f) are formed into a fibrous web by carding. Carding is a mechanical process, wherein the staple fibers are combed into a web by a carding machine, which may be a rotating drum or series of drums covered in fine wires or teeth. The precise configuration of cards will depend on the desired fabric weight and fiber orientation. The web can be parallel-laid, where most of the fibers are laid in the direction of the web travel, or they can be random-laid. Typical parallel-laid carded webs result in good tensile strength, low elongation and low tear strength in the machine direction and the reverse in the cross direction. Relative speeds and web composition can be varied to produce a wide range of fabrics with different properties.

In this embodiment of the process of the present invention, the fibrous web comprises staple fibers having a filament diameter in the range from 15 to 35 µm, preferably 14 to 25 µm, a titer in the range of 1 to 6 dtex, preferably 1.5 to 4 dtex, and a staple length in the range of 30 to 90 mm, preferably 40 to 60 mm.

In another embodiment of the present invention, the fibrous web comprises filaments having a filament diameter in the range from 15 to 35 µm, preferably 14 to 25 µm and a titer in the range of 1 to 6 dtex, preferably 1.5 to 4 dtex.

It is understood that steps f) and g) of the present invention may be performed in a single operational step or in separate steps. For example, if filaments are formed by the meltblown process, the freshly extruded fibers may be sprayed directly onto and/or deposited onto a suitable surface, such as a chill roll or a conveyor belt, forming the fibrous web precursor.

According to one embodiment, in step g) the nonwoven fabric is formed by collecting the fibers on a surface or carrier. For example, the fibers can be collected on a foraminous or perforated surface such as a moving screen or a forming wire. The fibers may be randomly deposited on the foraminous or perforated surface so as to form a non-woven fabric, which may be held on the surface by a vacuum force.

Alternatively, filaments may be formed separately into a fibrous web by any filament laying step known to the skilled person.

According to one embodiment of the present invention, in steps 0 and g) the mixture is formed into fibers by combining one or more of a melt blown process and a spunbond process and/or dry laid- or wet laid- or air laid process as described above in any order.

By combining a meltblown and a spunbond process, a multilayer nonwoven web precursor can be produced, for example, a nonwoven web precursor comprising two outer layers of spunbond fabric and an inner layer of a meltblown web precursor, which is known in the art as spunbonded-meltblown-spunbonded (SMS) web precursor. Additionally either or both of these processes may be combined in any arrangement with a staple fiber carding process.

The nonwoven fabric produced by the inventive process can be a multilayered nonwoven fabric, preferably a spundbonded-meltblown-spunbonded (SMS), a meltblown-spunbonded-meltblown (MSM), a spundbonded-meltblown-spunbonded-meltblown (SMSM), a meltblown-spunbonded-meltblown-spunbonded (MSMS), a spundbonded-meltblown-meltblown-spunbonded (SMMS), or a meltblown-spunbonded-spunbonded-meltblown (MSSM) nonwoven fabric. Said nonwoven fabric may be compressed in order to ensure the cohesion of the layers, for example, by lamination.

According to one embodiment, steps f) and g) of the inventive process are repeated two or more times to produce a multilayer web precursor, preferably a spundbonded-meltblown-spunbonded (SMS), a meltblown-spunbonded-meltblown (MSM), a spundbonded-meltblown-spunbonded-meltblown (SMSM), a meltblown-spunbonded-meltblown-spunbonded (MSMS), a spundbonded-meltblown-meltblown-spunbonded (SMMS), or a meltblown-spunbonded-spunbonded-meltblown (MSSM) web precursor. However, it is appreciated that further multilayer web precursors, such as a spunlaid-airlaid-carded (SAC) web precursor, may be produced.

h) Hydroentanglement

According to step h) of the process of the present invention, the nonwoven fabric is formed from the fibrous web of step g) by hydroentanglement. FIG. 1 shows the schematic process of one of the one or more bonding steps of the hydroentanglement process.

Hydroentanglement, also known as spunlacing, is a process which employs high pressure water jets (23) to entangle fibers in a loose web (10), thereby creating a fabric (11) held together by frictional forces between the said fibers. The loose web (10) is conveyed on a microperforated sleeve (31) located on a perforated support (30) and is held on said support by means of a vacuum (32). Water jets (23) are produced by passing water (21) in a high pressure injector (20) through a strip of holes (22).

The inventors surprisingly found out that the hydroentangling step is crucial to obtain a nonwoven fabric having the desired tactile and haptic properties, while preferably retaining the mechanical properties of the nonwoven fabric at acceptable costs. For example, if the web is fastened by a thermobonding step, the fibers on the surface of the nonwoven fabric are at least partially molten to adhere to each other. This creates a smooth surface leading to a slick and oily handfeel of the nonwoven. Likewise, if the web precursor is fastened by chemical bonding, the surface of the nonwoven fabric would be smoothened, causing the nonwoven fabric to lose its advantageous tactile and haptic properties. Furthermore, the space between the fibers would be congested, leading to a decreased absorption capacity.

In a preferred embodiment, the hydroentanglement is performed as a two-step process comprising a pre-bonding step and one or more bonding steps.

In the pre-bonding step, the web precursor of step g) is wetted to eliminate air pockets and to ensure the fiber cohesion and adhesion between the loose web (10) and the microperforated sleeve (31) during web precursor handling. Furthermore, this step serves as a first compaction step. The pre-bonding step is advantageously performed at water pressures of about 50 to 120 bar, preferably 60 to 110 bar, more preferably 65 to 105 bar. Preferably, the pre-bonding step is performed at a water pressure below the water pressure used in the bonding step. For example, a pre-bonding step may be performed in a cylinder comprising one or more injectors, preferably two injectors. Each injector comprises a strip of holes, which direct the water jet onto the fibrous web. For example, a strip of holes may comprise one or more rows of holes, preferably two rows of holes. The holes may have a diameter in the range of 60 to 200 µm, preferably 80 to 180, more preferably 80 to 160, and most preferably 100 to 140 µm. The gap between each hole may be in the range of 0.6 mm to 2 mm, preferably 0.8 mm to 1.8 mm, and more preferably 1 mm to 1.6 mm.

In the following one or more bonding steps, the fibers are entangled, which fastens the nonwoven fabric. For example, a bonding step may be performed in a cylinder comprising one or more injectors (20), preferably two injectors (20). Each injector (20) comprises a strip of holes (22), which direct the water jet (23) onto the fibrous web (10). For example, a strip of holes (22) may comprise one or more rows of holes, preferably two rows of holes. The holes may have a diameter in the range of 60 to 200 µm, preferably 80 to 180, more preferably 80 to 160, and most preferably 100 to 140 µm. The gap between each hole may be in the range of 0.6 mm to 2 mm, preferably 0.8 mm to 1.8 mm, and more preferably 1 mm to 1.6 mm.

The one or more bonding steps may be performed at water pressures in the range of 80 to 170 bar, preferably from 90 to 170 bar, more preferably from 90 to 160 bar, and most preferably from 95 to 155 bar. However, it is appreciated that the final bonding step is performed at water pressures in the range of 80 to 170 bar, preferably from 90 to 170 bar, more preferably from 90 to 160 bar, and most preferably from 95 to 155 bar. Preferably, the one or more bonding steps are performed at water pressures, which are higher than the water pressure of the pre-bonding step. Furthermore, each subsequent bonding step of the one or more bonding step may be performed at a higher, lower, or equal water pressure compared to the preceding bonding step.

It is essential that the one or more bonding steps are performed at water pressures, which do not exceed 170 bar, preferably 160 bar, and more preferably 155 bar. The inventors found out that higher water pressures lead to an increased compaction of the material, causing it to lose the desired tactile and haptic properties. Furthermore, it is desirable from an ecologic point of view to perform the bonding steps at lower water pressures as described herein, as less energy is required to generate the water jets.

In an exemplary embodiment, the web precursor of step f) is hydroentangled in step h) by a process comprising a pre-bonding step, which is performed at a water pressure in the range of from 60 to 110 bar, preferably 65 to 105 bar, and one or more, preferably two, bonding steps, which are performed at a water pressure in the range of 90 to 160 bar, preferably 95 to 155 bar, and wherein the water pressure of the final bonding step is in the range of 90 to 160 bar, preferably 95 to 155 bar. It is appreciated that each of the pre-bonding step and the bonding steps may be performed on the same or different cylinders comprising one or more, preferably two injectors (20) having the same or different configuration, such as a strip of holes (22) comprising one or more rows of holes, preferably two rows of holes, wherein the holes may have a diameter in the range of 80 to 180, preferably 80 to 160, and more preferably 100 to 140 µm, and wherein the gap between each hole may be in the range of 0.8 mm to 1.8 mm, preferably 1 mm to 1.6 mm. However, it is preferred that each of the pre-bonding step and the bonding steps may be performed on different cylinders comprising one or more, preferably two injectors (20) having the same configuration, such as a strip of holes (22) comprising one or more rows of holes, preferably two rows of holes, wherein the holes may have a diameter in the range of 80 to 180, preferably 80 to 160, and more preferably 100 to 140 µm, and wherein the gap between each hole may be in the range of 0.8 mm to 1.8 mm, preferably 1 mm to 1.6 mm.

It is appreciated that in any of the embodiments as descried herein, at least 95%, preferably at least 98%, more preferably at least 99% of the process water used during the hydroentanglement step may be recycled.

It is appreciated that a multilayered nonwoven fabric may be obtained by subjecting a multilayered nonwoven web precursor as described in step g) to the hydroentanglement step h).

After the bonding step, the nonwoven fabric is dried by means known to the skilled person. For example, the nonwoven fabric may be dried by air blowing or tumble drying. It is appreciated that the drying step is performed at a temperature well below the glass transition temperature of the polymer compound to avoid thermobonding of the web, which would increase sticking of the fibers and lead to the deterioration of the desired tactile and haptic properties. Preferably, drying is performed at a temperature below 135° C., more preferably below 120° C., even more preferably below 100° C., for example at about 90° C.

In an exemplary embodiment, the nonwoven fabric, which is obtained in step h) by a process comprising a pre-bonding step, which is performed at a water pressure in the range of from 60 to 110 bar, preferably 65 to 105 bar, and one or more, preferably two, bonding steps, which are performed at a water pressure in the range of 90 to 160 bar, preferably 95 to 155 bar, and wherein the water pressure of the final bonding step is in the range of 90 to 160 bar, preferably 95 to 155 bar, may be dried at a temperature below 135° C., more preferably below 120° C., even more preferably below 100° C., for example at about 90° C.

Preferably, the parameters of the bonding step as described above are adjusted to obtain a nonwoven fabric having a water vapor transmission rate of at least 1000 g/(m² day), measured according to ASTM E398-13, preferably of at least 2000 g/(m² day), and more preferably of at least 3000 g/(m² day).

The water vapor transmission rate of the nonwoven fabric is considered a measure of the tactile and haptic properties. Accordingly, a nonwoven fabric having the desired tactile and haptic properties may be obtained by adjusting the water vapor transmission rate having a minimum value as described above. It should be understood, however, that the present invention is not primarily directed to the provision of a breathable nonwoven fabric. Rather, the water vapor transmission rate is an indication of tactile and haptic properties such as "fluffiness", and/or "downiness", as will be apparent from the examples presented hereinafter.

It is appreciated that the process as described above enables the skilled person to obtain a nonwoven fabric having a water vapor transmission rate as described. Based on the description of the process of the present invention, the skilled person will be enabled to implement further obvious and/or routine modifications to obtain a nonwoven fabric as described herein.

In an exemplary embodiment of the process of present invention, the nonwoven fabric as obtained in the process comprises fibers having an average fiber diameter in the range of 14 to 30 µm, preferably 14 to 25 µm, or from 15 to 30 µm, and most preferably from 15 to 25 µm, wherein the fibers comprise from 5 wt.-% to 15 wt.-% of a surface-treated calcium carbonate-containing filler material, based on the total weight of the fibers, a first polypropylene polymer having a melt flow rate MFR of 15 to 40 g/10 min, as measured according to ISO1133:2011 at 230° C. under a load of 2.16 kg, and a second polypropylene polymer having a melt flow rate MFR of 15 to 40 g/10 min, as measured according to ISO1133:2011 at 230° C. under a load of 2.16 kg. In this exemplary embodiment, the surface-treated calcium carbonate-containing filler material preferably comprises a calcium carbonate-comprising filler material having a median particle size diameter $d_{50}$ value from 0.25 µm to 5 µm, preferably from 0.5 to 4 µm, more preferably from 1.0 µm to 3.5 µm, a top cut ($d_{98}$) of 10 µm, more preferably of 7.5 µm, and a BET specific surface area of from 0.5 to 50 m²/g, preferably of from 0.5 to 35 m²/g and most preferably of from 0.5 to 15 m²/g, measured using nitrogen and the BET method according to ISO 9277:2010, and a surface-treatment layer on at least a part of the surface of said calcium carbonate-containing filler material, wherein the surface-treatment layer is formed by contacting the calcium carbonate-containing filler material with a surface treatment agent in an amount from 0.1 to 3 wt.-%, based on the total dry weight of the calcium carbonate-containing filler material, and wherein the surface treatment agent comprises at least one mono-substituted succinic anhydride, preferably a mixture of alkenyl succinic anhydrides and/or alkenyl succinic acids, wherein the alkenyl succinic anhydrides and/or alkenyl succinic acids are mono-substituted with a group selected from any linear or branched mono-alkenyl group having a total amount of carbon atoms from C12 to C20, preferably from C15 to C20. In this case, the alkenyl succinic anhydride will typically comprise at least 80 wt.-% of the mixture, based on the total weight of the mixture, preferably at least 85 wt.-%, more preferably at least 90 wt.-% and most preferably at least 93 wt.-%. The nonwoven fabric according to this embodiment will have a water vapor transmission rate of at least 1000/(m² day), measured according to ASTM E398-13, preferably of at least 2000 g/(m² day), and more preferably of at least 3000 g/(m² day).

According to an optional embodiment of the inventive process, the obtained nonwoven fabric is subjected to a post-treatment step. It is appreciated that the post-treatment step is selected from post-treatments, which do not disturb the tactile and haptic properties of the nonwoven fabric, such as printing, dyeing, embossing, creping, raising or perforation.

It is to be understood that the embodiments and features of the process of the present invention as described hereinabove also apply to the inventive product, the inventive use and the article comprising the inventive product.

The Nonwoven Fabric

According to a second aspect of the present invention, a nonwoven fabric is provided, wherein the nonwoven fabric has a water vapor transmission rate of water vapor transmission rate of at least 1000 g/(m² day), measured according to ASTM E398-13, preferably of at least 2000 g/(m² day), and more preferably of at least 3000 g/(m² day).

It is appreciated that the nonwoven fabric according to the second aspect of the present invention is formed from fibers as defined in step f) of the process of the present invention, wherein the fibers comprise the surface-treated calcium carbonate-containing filler material, the first polypropylene polymer and the second polypropylene polymer as defined hereinabove.

Furthermore, it is appreciated that the skilled person is enabled to obtain the nonwoven fabric having a water vapor transmission rate of at least 1000 g/(m² day), measured according to ASTM E398-13, preferably of at least 2000 g/(m² day), and more preferably of at least 3000 g/(m² day), by the inventive process as outlined herein.

The inventive nonwoven fabric has suitable tactile and haptic properties, such as a "cotton-feel", as described above.

Use of the Coated Calcium Carbonate in the Inventive Nonwoven Fabric

According to a third aspect of the present invention, the use of the surface-treated calcium carbonate-containing filler material for the manufacture of a nonwoven fabric having a water vapor transmission rate of at least 1000 g/(m² day), measured according to ASTM E398-13, preferably of at least 2000 g/(m² day), and more preferably of at least 3000 g/(m² day), is described.

The use of a surface-treated calcium carbonate-containing filler material as defined hereinabove in a nonwoven fabric having a water vapor transmission rate of at least 1000 g/(m² day), measured according to ASTM E398-13, preferably of at least 2000 g/(m² day), and more preferably of at least 3000 g/(m² day), imparts the desired tactile and haptic properties to the nonwoven fabric.

In one embodiment, the surface-treated calcium carbonate-containing filler material is used in a process as described herein to obtain a nonwoven fabric as described herein.

Articles Comprising the Nonwoven Fabric

According to the fourth aspect of the present invention, an article comprising the nonwoven fabric as defined above is provided. The article is preferably selected from the group comprising hygiene products, medical and healthcare products, filter products, geotextile products, agriculture and horticulture products, clothing, footwear and baggage products, household and industrial products, packaging products, construction products and the like.

In view of the good tactile and haptic properties of the nonwoven fabrics obtained in the process as described herein, it is particularly preferred that the article comprising the nonwoven fabric is selected from the group consisting of hygiene products, medical and healthcare products.

Preferably, the hygiene products are selected from the group comprising absorbent hygiene products such as baby diapers or nappies, feminine hygiene, adult incontinence products, depilatory strips, bandages and wound dressings, disposable bath and face towels, disposable slippers and footwear, top sheets or coverstocks, consumer face masks, leg cuffs, acquisition/distribution layers, core wraps, back sheets, stretch ears, landing zones, dusting layers and fastening systems; and wipes.

In a particularly preferred embodiment, the article is selected from wipes, preferably personal care wipes, such as wet wipes, skin care wipes, baby wipes, facial wipes, cleansing wipes, hand and body wipes, moist towelettes, personal hygiene wipes, feminine hygiene wipes, or from wipes such as household care wipes, floor care wipes, cleaning wipes, pet care wipes, antibacterial wipes and medicated wipes.

Preferably, the medical and healthcare products are selected from the group comprising medical products which can be sterilized, medical packaging, caps like surgical disposable caps, protective clothing, surgical gowns, surgical masks and face masks, surgical scrub suits, surgical covers, surgical drapes, wraps, packs, sponges, dressings, wipes, bed linen, contamination control gowns, examination gowns, lab coats, isolation gowns, transdermal drug delivery, shrouds, underpads, procedure packs, heat packs, ostomy bag liners, fixation tapes, incubator mattress, sterilisation wraps (CSR wrap), wound care, cold/heat packs, drug delivery systems like patches.

Preferably, the filter products are selected from the group comprising gasoline filters, oil filters, air filters, water filters, coffee filters, tea bags, pharmaceutical industry filters, mineral processing filters, liquid cartridge and bag filters, vacuum bags, allergen membranes and laminates with nonwoven layers.

Preferably, the geotextile products are selected from the group comprising soil stabilizers and roadway underlayment, foundation stabilizers, erosion control, canals construction, drainage systems, geomembrane protection, frost protection, agriculture mulch, pond and canal water barriers, sand infiltration barrier for drainage tile and landfill liners.

Preferably, the agriculture and horticulture products are selected from the group comprising crop covers, plant protection, seed blankets, weed control fabrics, greenhouse shading, root control bags, biodegradable plant pots, capillary matting, and landscape fabric.

Preferably, the clothing, footwear and baggage products are selected from the group comprising interlinings like fronts of overcoats, collars, facings, waistbands, lapels etc., disposable underwear, shoe components like shoelace eyelet reinforcement, athletic shoe and sandal reinforcement and inner sole lining etc., bag components, bonding agents, composition and (wash) care labels.

Preferably, the packaging products are selected from the group comprising interlinings like desiccant packaging, sorbents packaging, gift boxes, file boxes, nonwoven bags, book covers, mailing envelopes, Express envelopes, courier bags and the like.

Preferably, the household and industrial products are selected from the group comprising abrasives, bed linen like pocket cloth for pocket springs, separation layer, spring cover, top cover, quilt backing, duvet coverings, pillow cases etc., blinds/curtains, carpet/carpet backings like scatter rugs, carpet tiles, bath mats etc., covering and separation material, detergent pouches, fabric softener sheets, flooring, furniture/upholstery like inside lining, reverse fabric for cushions, dust cover, spring covering, pull strips etc., mops, table linen, tea and coffee bags, vacuum cleaning bags, wall-covering, automotive building, cable wrapping, civil engineering, filtration packaging, protective clothing, primary and secondary carpet backing, composites, marine sail laminates, tablecover laminates, chopped strand mats, backing/stabilizer for machine embroidery, packaging where porosity is needed, insulation like fiberglass batting, pillows, cushions, padding like upholstery padding, batting in quilts or comforters, mailing envelopes, tarps, tenting and transportation (lumber, steel) wrapping, disposable clothing like foot coverings and coveralls, and weather resistant house wraps.

Preferably, the construction products are selected from the group comprising house wrap, asphalt overlay, road and railroad beds, golf and tennis courts, wallcovering backings, acoustical wall coverings, roofing materials and tile underlayment, soil stabilizers and roadway underlayment, foundation stabilizers, erosion control, canals construction, drainage systems, geomembrane protection, frost protection, agriculture mulch, pond and canal water barriers, and sand infiltration barriers for drainage tile.

The following examples are meant to additionally illustrate the invention. However, the examples are not meant to restrict the scope of the invention in any way.

EXAMPLES

In the following, measurement methods and materials implemented in the examples are described.
Measurement Methods
Particle Size The particle distribution of the calcium carbonate filler was measured using a Sedigraph 5120 from the company Micromeritics, USA. The method and the instruments are known to the skilled person and are commonly used to determine grain size of fillers and pigments. The measurement was carried out in an aqueous solution comprising 0.1 wt.-% $Na_4P_2O_7$. The samples were dispersed using a high speed stirrer and supersonics.
Specific Surface Area Throughout the present document, the specific surface area (in $m^2/g$) is determined using the BET method (using nitrogen as adsorbing gas), which is well known to the skilled man (ISO 9277:2010). The total surface area (in $m^2$) of the filler material is then obtained by multiplication of the specific surface area and the mass (in g) of the corresponding sample.
Total Moisture Content The total moisture contents as defined herein are measured according to the Karl Fischer coulometric titration method, desorbing the moisture in an oven at 220° C. for 10 min and passing it continuously into a Karl Fischer coulometer (Mettler-Toledo coulometric KF Titrator C30, combined with Mettler-Toledo oven DO 0337) using dry nitrogen at 100 ml/min, e.g., for 10 min. A calibration curve using water is recorded and a blank of 10 min nitrogen flow without a sample is taken into account.
Titer or Linear density (Continuous Filaments)

The titer or linear density [dtex] was measured according to EN ISO 2062:2009 and corresponds to the weight in grams of 10 000 m fiber. A sample of 25 or 100 metres was wound up on a standard reel under a pretension of 0.5 cN/tex and weighted on analytical scale. The grams per 10 000 m fiber length were then calculated.
Fiber Diameter (Staple Fibers and Spunlaid Fibers)

The fiber diameter [µm] was measured according to EN ISO 137:2015. A nonwoven sample, or fiber sample was placed into a microscope (MESDAN Micro Lab 250E). The analysis consists of the measurement of the distance between each side of the fiber to determine the fiber diameter using the best optical degree. Generally, between 20 to 50 measures were taken to determine the mean value.
Fabric Weight Fabric weight or mass per unit area [g/m2] was measured according to EDANA/INDA test procedure NWSP 130.1.RO (15) or ISO 9073-1:1989.
Ash Content The ash content in [%] of the fibers and the masterbatches was determined by incineration of a sample in an incineration crucible which is put into an incineration furnace at 570° C. for 2 hours. The ash content is measured as the total amount of remaining inorganic residues.
Water Vapour Transmission Rate (WVTR)

The WVTR value of the nonwoven fabric as measured with a Lyssy L80-5000 (PBI-Dansensor A/S, Denmark) measuring device according to ASTM E398-13.
Materials PP1: Polymer 1: Polypropylene homopolymer Borealis HG 475FB (MFR: 27 g/10 min (230° C., 2.16 kg) according to technical data sheet), commercially available from Borealis AG, Vienna, Austria.

PP2: Polymer 2: Polypropylene homopolymer Borealis HG 455FB (MFR: 27 g/10 min (230° C., 2.16 kg) according to technical data sheet), commercially available from Borealis AG, Vienna, Austria.

PP3: Polymer 3: Polypropylene homopolymer Total Polypropylene PPH 9099 (MFR: 25 g/10 min (230° C., 2.16 kg) according to technical data sheet), commercially available from Total Petrochemicals, Feluy, Belgium.

SF1: Staple fiber 1: Polypropylene staple fibers HY-Light-S (fiber length: 40 mm, titer: 3.3 dtex, according to technical data sheet), commercially available from ES Fibersvisions ApS, Varde, Denmark.

SF2: Staple fiber 2: Polyester staple fibers Max Model 140 (fiber length: 60 mm, titer: 3.3 dtex, according to technical data sheet), commercially available from Max Model SAS, Lyon, France.

SF3: Staple fiber 3: Viscose staple fibers Lenzing (fiber length: 60 mm, titer: 3.3 dtex, according to technical data sheet), commercially available from Lenzing AG, Lenzing, Austria.

CC1 (inventive): Natural ground calcium carbonate, commercially available from Omya International AG, Switzerland ($d_{50}$: 1.7 µm; $d_{98}$: 6 µm, content of particles <0.5 µm=12%), surface-treated with 0.7 wt. % alkenyl succinic anhydride (CAS [68784-12-3], concentration >93%), based on the total weight of the natural ground calcium carbonate. BET: 3.4 $m^2/g$, residual moisture content: 0.1 wt.-%.

CC2 (inventive): Natural ground calcium carbonate, commercially available from Omya International AG, Switzerland ($d_{50}$: 0.8 µm; $d_{98}$: 3 µm, content of particles <0.5 µm=35%), surface-treated with 0.7 wt. % alkenyl succinic anhydride (CAS [68784-12-3], concentration >93%), based on the total weight of the natural ground calcium carbonate. BET: 8.5 $m^2/g$, residual moisture content: 0.5 wt.-%.

Example 1

Preparation of Masterbatches

Polypropylene masterbatches containing the calcium carbonate fillers CC1 and CC2 and the polymer P1 were continuously prepared on a lab scale Buss kneader (Buss PR46 from Buss AG, Switzerland).

The compositions and filler contents of the prepared masterbatches are compiled in Table 1 below. The precise filler content was determined by the ash content.

TABLE 1

Composition and filler content of prepared masterbatches.

| Masterbatch | Polymer | Filler | Filler content [wt.-%] | Ash content [wt.-%] |
|---|---|---|---|---|
| MB1 (inventive) | PP1 | CC1 | 70 | 68.9 |
| MB2 (inventive) | PP1 | CC2 | 70 | 68.2 |

Example 2

Preparation of Nonwoven Fabrics (Via Spunlaid Process A with Hydro-Entanglement)

Masterbatches according to Example 1 were mixed with polymer PP2 and were directly dosed together into a single screw extruder equipped with a melt pump. Nonwoven fabrics were produced from these mixtures on a Hills spunbond pilot line, width 550 mm (Hills Inc. West Melbourne, Fla.; USA), equipped with a spin pack with 1003 holes/500 mm, 0.35 mm hole diameter. The extruder temperature was set at 235° C. with a throughput of 0.6 g/hole/min. The quenching temperature was 15° C. at 900 mm distance. The extruded filaments with 17 µm filament diameter were produced with filament speed at 2900 m/min with a fiber gap of 8 mm and 1.5 bar air pressure and formed into a nonwoven web. The filament laying distance was 400 mm and conveyor the belt speed was adjusted to receive 40 gsm nonwoven fabric weight.

The hydroentanglement process was used for bonding of the nonwoven web with an Andritz Jetlace 3000, machine width 600 mm (Andritz Perfojet SAS, Montbonnot, France). Pre-bonding was performed at 80 bar water pressure. The bonding was performed with 2 cylinders and 3 injectors (2112 strips at 2 rows with diameter 120 µm and 1.2 mm gap) in two bonding steps. Bonding step 1 was performed at cylinder 1 at a water pressure of 80 bar for injector 1 and 100 bar for injector 2. Bonding step 2 was performed at cylinder 2 at a water pressure of 100 bar for injector 1 and 80 bar for injector 2. The nonwoven fabrics were dried at 80° C. in an omega oven.

The final bonded nonwoven fabric had a target fabric weight of 40 g/m², which was adjusted by the line speed. The compositions of the produced nonwoven materials are compiled in Table 2 below.

TABLE 2

Compositions of the prepared nonwoven fabrics (wt.-% is based on total weight of the sample).

| Sample | Masterbatch [wt.-%] | Ash content [wt.-%] |
|---|---|---|
| 1 (comparative) | — | 0 |
| 2 (inventive) | 14% MB1 | 9.6 |

Example 3

Preparation of Nonwoven Fabrics (Via Spunlaid Process B with Hydro-Entanglement)

Masterbatches according to Example 1 were mixed with polymer PP3 and were directly dosed together into a single screw extruder equipped with a melt pump. Nonwoven fabrics were produced from these mixtures on a Reicofil 4 pilot line, 1 meter width (Reifenhäuser Reicofil GmbH & Co. KG, Troisdorf, Germany), equipped with a spin pack with 7377 holes, core/sheath configuration, 0.6 mm hole diameter. Extruder temperature at 240° C. with a throughput of 0.56 g/hole/min. The quenching temperatures were at 25°/20° C. and the cabin pressure was set to 4500 Pa. The extruded filaments were formed into a nonwoven web.

The hydroentanglement process was used for bonding of the nonwoven web with a Fleissner Aquajet, machine width 600 mm (Trützschler Nonwovens GmbH, Dulmen, Germany). The bonding was performed with 2 cylinders and 3 injectors. The processing conditions for the hydro-entanglement are summarized in Table 3. The distance to belt 1 was kept at 35 mm and the distances to belt 2 and belt 3 were kept at 10 mm for all samples. The nonwoven fabrics were dried in an IR drier at 38° C. and an omega oven at 130° C.

The final bonded nonwoven fabrics had a target fabric weight of 40 g/m², which was adjusted by the line speed. The compositions of the produced nonwoven materials are compiled in Table 3 below.

TABLE 3

Compositions of the prepared nonwoven fabrics (wt.-% is based on total weight of the sample) and the processing conditions for the hydro-entanglement

| Sample | Masterbatch [wt.-%] | Ash content [wt.-%] | Pressure beam 1 [bar] | Pressure beam 2 [bar] | Pressure beam 3 [bar] |
|---|---|---|---|---|---|
| 6 (comparative) | — | 0 | 80 | 150 | 150 |
| 7 (inventive) | 14% MB1 | 9.6 | 80 | 150 | 150 |
| 8 (comparative) | 14% MB1 | 9.5 | 100 | 185 | 185 |

Example 4

Preparation of Multifilament Fibres

Multifilament fibres were produced by mixing of polymer PP1 and the masterbatches according to Tables 4 and 5 using a Hills multifilament pilot line (Hills Inc. West Melbourne, Fla.; USA), equipped with two single screw extruders with melt pump and spin pack (round shape bicomponent core sheath) with 74 filaments having a diameter of 0.35 mm.

TABLE 4

Compositions of the prepared PP multifilament fibers

| Sample | Masterbatch [wt.-%] |
|---|---|
| 4 (inventive) | 14% MB 1 |

TABLE 5

Machine conditions for multifilament fiber spinning.

| Parameter | Multifilament fibers with PP |
|---|---|
| Extruder temperature | 195-230° C. |
| Adapter temperature | 230° C. |
| Spin head temperature | 235° C. |
| Godet Roll speed | Roll 1: 385 m/min |
| | Roll 2: 1360 m/min |
| | Roll 3: 1370 m/min |
| Draw ratio | 2.8 |

The resulting multifilament fibers were converted to staple fibers with a cutting length of 40 mm using a lab pilot line in a conventional manner by unwinding, crimping, fixing the crimp in the oven and cutting them into staple fibers.

Example 5

Preparation of Nonwoven Fabrics (Via Carding Process with Hydro-Entanglement)

The bale opening and blending step was done on a Laroche Opening & Blending line (Laroche SA, Cours, France) with bale openers, horizontal opener and fine opener. The opened staple fibers were then fed into the carding line.

Carded nonwoven fabric samples were produced on an Andritz Nexline Spunlace carding pilot line (Andritz Asselin-Thibeau SAS, Elbeuf, France) equipped with main cylinder, breast roll, doffer, strippers and workers. Nonwoven samples were produced with the following settings: main cylinder at 1400 meter per minute [mpm], breast roll at 700 mpm, all other rolls between 130 and 230 mpm. The outlet speed was 22 mpm and the outlet width was 600 mm.

The hydroentanglement process was used for bonding of the nonwoven web with an Andritz Jetlace 3000, machine width 600 mm (Andritz Perfojet SAS, Montbonnot, France). Pre-bonding was performed at 70 bar water pressure. The bonding was performed with 2 cylinders and 4 injectors (2J12 strips at 2 rows with diameter 120 µm and 1.2 mm gap) with 80 bar water pressure at injector 1 and 100 bar water pressure at injector 2 on cylinder 1, 100 bar water pressure at injector 1 and 80 bar water pressure at injector 2 on cylinder 2. The nonwoven fabric was dried at 90° C. in an omega oven.

The final bonded nonwoven webs with 60 cm width had target fabric weights of 40 and 30 g/m².

The compositions of the produced nonwoven materials are compiled in Table 6 below.

TABLE 6

Compositions of the prepared nonwoven fabrics (wt.-% is based on total weight of the sample).

| Sample | Staple fiber + CC1 or CC2 | Content of CC1 or CC2 [wt.-%] | Fiber blends | Targeted fabric weight |
|---|---|---|---|---|
| 3 (comparative) | SF1 | none | none | 40 |
| 4 (inventive) | PP1 + CC1 | 10% | none | 40 |
| 5 (comparative) | SF2 + SF3 | none | none | 40 |

Example 6

Tactile Properties Testing with Sensorics Panel

The tactile properties were evaluated with a sensorics panel. The purpose is to characterize the tactile properties of nonwoven fabric samples in a comparative way by means of human perception. The retained sensory methodology is an analytic quantitative approach permitting to describe and position the studied nonwoven fabrics on every pertinent tactile components generated by the panel (descriptors) in an adapted lexicon (monadic sensory profile: study one by one) based on the standard NF ISO 13299:2016.

The sensory expert tactile panel was composed of 9 experienced and trained persons. The descriptors, which were determined by the panel, are given in Table 7.

TABLE 7

Sensory descriptors

| Descriptor | Rating | Description | Testing Method |
|---|---|---|---|
| Softness | 0—the least soft 10—the softest | Overall feeling of the touch of the material with an individual perceptive character. | Stroke the surface of the material without pressure and in both directions. Judge the pleasant aspect of the material. |
| Downiness | 0—the least downy 10—the most downy | Describes the presence of fibers in the surface of the material. | Appose the hand flat on the surface of the sample without pressure. Make microdeplacement of the digital pulp by small circular movements on the surface of the material, so as the fibers to roll under the fingers. |
| Fluidity | 0—the least fluid 10—the most fluid | Describes the ease with which the sample glides and flows between the finders (lack of manipulation resistancy) | Seize the sample by a corner and slide the material in the hollow of the other hand. |
| Suppleness | 0—the least supple 10—the most supple | Describes the ease with which the sample deforms (absence of resistance in the deformation/folding) | Appose the hand flat on the surface of the sample without pressure. Slowly and delicately close the hand by fixing the material with the palm to feel the material deforming. |

The sensory test results were verified on statistical reliability by the mean of interferential statistic tools: ANOVA and Friedman Test.

The haptics characterization of the nonwoven samples revealed a tactile profile of the samples with large differences. These differences are statistically relevant and unique. The results are summarized in Table 8.

TABLE 8

Results of the tactile properties testing.

| Sample | Softness | Downiness | Fluidity | Suppleness |
|---|---|---|---|---|
| 1 (comparative) | 7.5 | 5.2 | 4.7 | 6.3 |
| 2 (inventive) | 8.7 | 7.9 | 9.3 | 9.2 |
| 3 (comparative) | 1.7 | 6.4 | 3.1 | 3.6 |
| 4 (inventive) | 3.1 | 7.2 | 6.7 | 6.6 |
| 5 (comparative) | 0.4 | 2.9 | 4.3 | 3.4 |
| 6 (comparative) | 4.1 | 2.4 | 3.8 | 3.4 |
| 7 (inventive) | 6.8 | 5.3 | 7.8 | 6.7 |
| 8 (comparative) | 4.4 | 2.6 | 5.5 | 6.5 |

Example 7

Determination of Water Vapor Transmission Rate

The nonwoven fabric samples were tested on their water vapor transmission behaviour. The results are compiled in Table 9.

TABLE 9

Compositions of the prepared nonwoven fabrics and measured water vapor transmission rate (WVTR) values

| Sample | | WVTR [g/m²/day] |
|---|---|---|
| 2 (inventive) | Spunbond, GCC | 3853 |
| 4 (inventive) | Carded, GCC | 4409 |
| 7 (inventive) | Spunbond, GCC | 4944 |
| 8 (comparative) | Spunbond, GCC (higher water pressure) | 25 |

Clauses

The invention may be summarized in the following clauses:

Clause 1. A process for producing a nonwoven fabric, the process comprising the following steps:
a) providing a surface-treated calcium carbonate-containing filler material, the surface-treated calcium carbonate-containing filler material comprising a calcium carbonate-containing filler material having prior to the surface treatment
  i) a weight median particle size ($d_{50}$) value in the range from 0.1 μm to 7 μm,
  ii) a top cut ($d_{98}$) value of 15 μm or less,
  iii) a specific surface area (BET) from 0.5 to 120 m²/g, as measured by the BET method, and
  iv) a residual total moisture content from 0.01 wt.-% to 1 wt.-%, based on the total dry weight of the at least one calcium carbonate-containing filler material,
  and a surface-treatment layer on at least a part of the surface of said calcium carbonate-containing filler material, wherein the surface-treatment layer is formed by contacting the calcium carbonate-containing filler material with a surface treatment agent in an amount from 0.1 to 3 wt.-%, based on the total dry weight of the calcium carbonate-containing filler material, and wherein the surface treatment agent comprises at least one carboxylic acid and/or a salt or anhydride thereof;
b) providing a first polypropylene polymer being an isotactic polypropylene homopolymer having a melt flow rate MFR (230° C./2.16 kg) in the range of 15 to 40 g/10 min, as measured according to EN ISO 1133:2011;
c) providing a second polypropylene polymer being an isotactic polypropylene homopolymer having a melt flow rate MFR (230° C./2.16 kg) in the range of 15 to 40 g/10 min, as measured according to EN ISO 1133:2011;
d) forming a masterbatch by compounding the surface-treated calcium carbonate-containing filler material of step a) in an amount of 60 wt.-% to 75 wt.-%, based on the total weight of the masterbatch, with the first polypropylene polymer of step b);
e) mixing the masterbatch of step d) with the second polypropylene polymer of step c) to obtain a mixture having a surface-treated calcium carbonate-containing filler material content in the range of 5 wt.-% to 15 wt.-%, based on the total weight of the mixture;
f) forming the mixture of step e) into fibers having an average fiber diameter in the range from 11 to 30 μm;
g) forming a fibrous web from the fibers of step f), and
h) forming the non-woven fabric by hydroentanglement of the fibrous web of step g), wherein the water pressure during hydroentanglement step h) does not exceed 170 bar and wherein the final bonding step during hydroentanglement is carried out at a water pressure in the range of 80 to 170 bar.

Clause 2. The process of clause 1, wherein the nonwoven fabric has a water vapor transmission rate of at least 1000 g/(m² day), preferably of at least 2000 g/(m² day), and more preferably of at least 3000 g/(m² day) measured according to ASTM E398-13.

Clause 3. The process of clause 1 or 2, wherein the surface-treated calcium carbonate-containing filler material of step a) comprises a calcium carbonate-containing filler material having prior to the surface treatment
  i) a weight median particle size ($d_{50}$) value in the range from 0.25 μm to 5 μm, preferably from 0.5 to 4 μm, more preferably from 0.5 to 4 μm, most preferably from 1.0 to 3.5 μm, and/or
  ii) a top cut ($d_{98}$) value of 15 μm or less, preferably of 12.5 μm or less, more preferably of 10 pm or less, most preferably of 7.5 μm or less, and/or
  iii) a specific surface area (BET) from 0.5 to 120 m²/g, preferably from 0.5 to 50 m²/g, more preferably from 0.5 to 35 m²/g, most preferably from 0.5 to 15 m²/g, as measured by the BET method, and/or
  iv) a residual total moisture content from 0.01 wt.-% to 0.2 wt.-%, preferably from 0.02 wt.-% to 0.15 wt.-%, based on the total dry weight of the at least one calcium carbonate-containing filler material.

Clause 4. The process of any of the preceding clauses, wherein the surface-treated calcium carbonate-containing filler material of step a) comprises a surface-treatment layer on at least a part of the surface of said calcium carbonate-containing filler material, wherein the surface-treatment layer is formed by contacting the calcium carbonate-containing filler material with a surface treatment agent in an amount from 0.1 to 2.5 wt.-%, preferably 0.1 to 2.0 wt.-%, more preferably 0.1 to 1.0 wt.-%, and most preferably 0.2 to 0.8 wt.-%, based on the total dry weight of the calcium carbonate-containing filler material.

Clause 5. The process of any of clauses 1 to 4, wherein the surface treatment agent comprises at least one monocarboxylic acid and/or a salt or anhydride thereof, preferably comprises at least one monocarboxylic acid and/or a salt thereof, and most preferably comprises stearic acid and/or a salt thereof.

Clause 6. The process of any of clauses 1 to 4, wherein the surface treatment agent comprises at least one dicarboxylic acid and/or a salt or anhydride thereof, preferably comprises at least one mono-substituted succinic anhydride and/or mono-substituted succinic acid and/or a salt thereof, and most preferably comprises at least one mono-substituted succinic anhydride.

Clause 7. The process of any of the preceding clauses, wherein the first polypropylene polymer of step b) and/or the second polypropylene polymer of step c) is an isotactic polypropylene homopolymer having a melt flow rate MFR (230° C./2.16 kg) in the range of 20 to 35 g/10 min, preferably 25 to 35 g/10 min, as measured according to EN ISO 1133:2011, wherein the first polypropylene polymer of step b) and the second polypropylene polymer of step c) are preferably the same polymer.

Clause 8. The process of any of the preceding clauses, wherein the masterbatch is formed in step d) by compounding the surface-treated calcium carbonate-containing filler material of step a) in an amount of 65 wt.-% to 74 wt.-%, preferably 68 wt.-% to 72 wt.-%, based on the total weight of the masterbatch, with the first polypropylene polymer of step b).

Clause 9. The process of any of the preceding clauses, wherein the fibers formed in step f) are staple fibers having
- an average fiber diameter in the range from 14 to 30 µm, preferably from 14 to 25 µm, or from 15 to 30 µm, and most preferably from 15 to 25 µm, and/or
- a titer in the range from 1 to 6 dtex, preferably 1.5 to 4 dtex, as measured by EN ISO 2062:2009 and/or
- a staple fiber length in the range from 30 to 90 mm, preferably 40 to 60 mm,
  - wherein the staple fibers are preferably formed from the mixture of step e) by a process comprising the steps of multifilament or monofilament extrusion and cutting, and/or
  - wherein the staple fibers are formed into a fibrous web during step g) preferably by carding.

Clause 10. The process of any of clauses 1 to 8, wherein the fibers formed in step f) are filaments having
- an average fiber diameter in the range from 14 to 30 µm, preferably from 14 to 25 µm, or from 15 to 30 µm, and most preferably from 15 to 25 µm, and/or
- a titer in the range from 1 to 6 dtex, preferably 1.5 to 4 dtex, as measured by EN ISO 2062:2009,
  - wherein the filaments are preferably formed from the mixture of step e) or e2) by spunbonding and/or meltblowing.

Clause 11. The process of any of the preceding clauses, wherein in hydroentanglement step h)
- the pre-bonding step is performed at a water pressure of about 50 to 120 bar, preferably 60 to 110 bar, more preferably 65 to 105 bar, and/or
- the water pressure does not exceed 160 bar, preferably 155 bar, and/or
- the water pressure of the final bonding step is in the range of 90 to 160 bar, preferably 95 to 155 bar, and/or
- at least 95%, preferably at least 98%, more preferably at least 99% of the process water is reused, and/or
- the nonwoven fabric is dried after the final bonding step at a temperature below 135° C., more preferably below 120° C., even more preferably below 100° C.

Clause 12. A nonwoven fabric formed from fibers, wherein the fibers have an average fiber diameter in the range from 11 to 30 µm and are composed of a mixture comprising
- a first polypropylene polymer, being an isotactic polypropylene homopolymer having a melt flow rate MFR (230° C./2.16 kg) in the range of 15 to 40 g/10 min, as measured according to EN ISO 1133:2011;
- a second polypropylene polymer being an isotactic polypropylene homopolymer having a melt flow rate MFR (230° C./2.16 kg) in the range of 15 to 40 g/10 min, as measured according to EN ISO 1133:2011, and
- a surface-treated calcium carbonate-containing filler material, the surface-treated calcium carbonate-containing filler material comprising a calcium carbonate-containing filler material having prior to the surface treatment
  - i) a weight median particle size ($d_{50}$) value in the range from 0.1 µm to 7 µm,
  - ii) a top cut ($d_{98}$) value of 15 µm or less,
  - iii) a specific surface area (BET) from 0.5 to 120 m$^2$/g, as measured by the BET method, and
  - iv) a residual total moisture content of from 0.01 wt.-% to 1 wt.-%, based on the total dry weight of the at least one calcium carbonate-containing filler material,
  - and a surface-treatment layer on at least a part of the surface of said calcium carbonate-containing filler material, wherein the surface-treatment layer is formed by contacting the calcium carbonate-containing filler material with a surface treatment agent in an amount from 0.1 to 3 wt.-%, based on the total dry weight of the calcium carbonate-containing filler material, and wherein the surface treatment agent comprises at least one carboxylic acid and/or a salt or anhydride thereof;
- wherein the surface-treated calcium carbonate-containing material is contained in the mixture in an amount from 5 wt.-% to 15 wt.-%, based on the total weight of the mixture, and wherein the nonwoven fabric has a water vapor transmission rate of at least 1000 g/(m$^2$ day), measured according to ASTM E398-13.

Clause 13. The nonwoven fabric of clause 12, wherein the nonwoven fabric has a water vapor transmission rate of at least 2000 g/(m$^2$ day), and preferably of at least 3000 g/(m$^2$ day), measured according to ASTM E398-13.

Clause 14. The nonwoven fabric of clause 12 or 13, wherein the surface-treated calcium carbonate-containing filler material comprises a calcium carbonate-containing filler material having prior to the surface treatment
- i) a weight median particle size ($d_{50}$) value in the range from 0.25 µm to 5 µm, preferably from 0.5 to 4 µm, more preferably from 0.5 to 4 µm, most preferably from 1.0 to 3.5 µm, and/or
- ii) a top cut ($d_{98}$) value of 15 µm or less, preferably of 12.5 µm or less, more preferably of 10 µm or less, most preferably of 7.5 µm or less, and/or
- iii) a specific surface area (BET) from 0.5 to 120 m$^2$/g, preferably from 0.5 to 50 m$^2$/g, more preferably from 0.5 to 35 m$^2$/g, most preferably from 0.5 to 15 m$^2$/g, as measured by the BET method, and/or
- iv) a residual total moisture content from 0.01 wt.-% to 0.2 wt.-%, preferably from 0.02 wt.-% to 0.15 wt.-%, based on the total dry weight of the at least one calcium carbonate-containing filler material.

Clause 15. The nonwoven fabric of any of clauses 12 to 14, wherein the surface-treated calcium carbonate-containing filler material comprises a surface-treatment layer on at least a part of the surface of said calcium carbonate-containing filler material, wherein the surface-treatment layer is formed by contacting the calcium carbonate-containing filler material with a surface treatment agent in an amount from 0.1 to 2.5 wt.-%, preferably 0.1 to 2.0 wt.-%, more preferably 0.1 to 1.0 wt.-%, and most preferably 0.2 to 0.8 wt.-%, based on the total dry weight of the calcium carbonate-containing filler material.

Clause 16. The nonwoven fabric of any of clauses 12 to 15, wherein the surface treatment agent comprises at least one monocarboxylic acid and/or a salt or anhydride thereof, preferably comprises at least one monocarboxylic acid and/or a salt thereof, and most preferably comprises stearic acid and/or a salt thereof.

Clause 17. The nonwoven fabric of any of clauses 12 to 15, wherein the surface treatment agent comprises at least one dicarboxylic acid and/or a salt or anhydride thereof, preferably comprises at least one mono-substituted succinic anhydride and/or mono-substituted succinic acid and/or a salt thereof, and most preferably comprises at least one mono-substituted succinic anhydride.

Clause 18. The nonwoven fabric of any of clauses 12 to 17, wherein the first polypropylene polymer and/or the second polypropylene polymer is an isotactic polypropylene homopolymer having a melt flow rate MFR (230° C./2.16 kg) in the range of 20 to 35 g/10 min, preferably 25 to 35 g/10 min, as measured according to EN ISO 1133:2011, wherein the first polypropylene polymer and the second polypropylene polymer are preferably the same polymer.

Clause 19. The nonwoven fabric of any of clauses 12 to 18, wherein the fibers are staple fibers having
- an average fiber diameter in the range from 14 to 30 μm, preferably from 14 to 25 μm, or from 15 to 30 μm, and most preferably from 15 to 25 μm, and/or
- a titer in the range from 1 to 6 dtex, preferably 1.5 to 4 dtex, as measured by EN ISO 2062:2009 and/or
- a staple fiber length in the range from 30 to 90 mm preferably 40 to 60 mm,
    - wherein the staple fibers are preferably formed from the mixture of step e) by a process comprising the steps of multifilament or monofilament extrusion and cutting, and/or
    - wherein the staple fibers are formed into a fibrous web during step g) preferably by carding.

Clause 20. The nonwoven fabric of any of clauses 12 to 18, wherein the fibers are filaments having
- an average fiber diameter in the range from 14 to 30 μm, preferably from 14 to 25 μm, or from 15 to 30 μm, and most preferably from 15 to 25 μm, and/or
- a titer in the range from 1 to 6 dtex, preferably 1.5 to 4 dtex, as measured by EN ISO 2062:2009,
    - wherein the filaments are preferably formed from the mixture of step e) or e2) by spunbonding and/or meltblowing.

Clause 21. Use of a surface-treated calcium carbonate-containing filler material for the manufacture of a nonwoven fabric having a water vapor transmission rate of at least 1000 g/(m² day), measured according to ASTM E398-13, preferably of at least 2000 g/(m² day), and more preferably of at least 3000 g/(m² day), wherein the surface-treated calcium carbonate-containing filler material comprises a calcium carbonate-containing filler material having prior to the surface treatment
- i) a weight median particle size ($d_{50}$) value in the range from 0.1 μm to 7 μm,
- ii) a top cut ($d_{98}$) value of 15 μm or less,
- iii) a specific surface area (BET) from 0.5 to 120 m²/g, as measured by the BET method, and
- iv) a residual total moisture content of from 0.01 wt.-% to 1 wt.-%, based on the total dry weight of the at least one calcium carbonate-containing filler material, and a surface-treatment layer on at least a part of the surface of said calcium
carbonate-containing filler material, wherein the surface-treatment layer is formed by contacting the calcium carbonate-containing filler material with a surface treatment agent in an amount from 0.1 to 3 wt.-%, based on the total dry weight of the calcium carbonate-containing filler material, and wherein the surface treatment agent comprises at least one carboxylic acid and/or a salt or anhydride thereof.

Clause 22. The use of clause 21, wherein the surface-treated calcium carbonate-containing filler material comprises a calcium carbonate-containing filler material having prior to the surface treatment
- i) a weight median particle size ($d_{50}$) value in the range from 0.25 μm to 5 μm, preferably from 0.5 to 4 μm, more preferably from 0.5 to 4 μm, most preferably from 1.0 to 3.5 μm, and/or
- ii) a top cut ($d_{98}$) value of 15 μm or less, preferably of 12.5 μm or less, more preferably of 10 pm or less, most preferably of 7.5 μm or less, and/or
- iii) a specific surface area (BET) from 0.5 to 120 m²/g, preferably from 0.5 to 50 m²/g, more preferably from 0.5 to 35 m²/g, most preferably from 0.5 to 15 m²/g, as measured by the BET method, and/or
- iv) a residual total moisture content from 0.01 wt.-% to 0.2 wt.-%, preferably from 0.02 wt.-% to 0.15 wt.-%, based on the total dry weight of the at least one calcium carbonate-containing filler material.

Clause 23. The use of any of clauses 21 or 22, wherein the surface-treated calcium carbonate-containing filler material comprises a surface-treatment layer on at least a part of the surface of said calcium carbonate-containing filler material, wherein the surface-treatment layer is formed by contacting the calcium carbonate-containing filler material with a surface treatment agent in an amount from 0.1 to 2.5 wt.-%, preferably 0.1 to 2.0 wt.-%, more preferably 0.1 to 1.0 wt.-%, and most preferably 0.2 to 0.8 wt.-%, based on the total dry weight of the calcium carbonate-containing filler material.

Clause 24. The use of any of clauses 21 to 23, wherein the surface treatment agent comprises at least one monocarboxylic acid and/or a salt or anhydride thereof, preferably comprises at least one monocarboxylic acid and/or a salt thereof, and most preferably comprises stearic acid and/or a salt thereof.

Clause 25. The use of any of clauses 21 to 23, wherein the surface treatment agent comprises at least one dicarboxylic acid and/or a salt or anhydride thereof, preferably comprises at least one mono-substituted succinic anhydride and/or mono-substituted succinic acid and/or a salt thereof, and most preferably comprises at least one mono-substituted succinic anhydride.

Clause 26. An article comprising the nonwoven fabric of clauses 12 to 20 and/or the nonwoven fabric as obtained in the process according to any of clauses 1 to 11.

The invention claimed is:

1. A process for producing a nonwoven fabric, the process comprising the following steps:
   a) providing a surface-treated calcium carbonate-containing filler material, the surface-treated calcium carbonate-containing filler material comprising a calcium carbonate-containing filler material having prior to the surface treatment
      i) a weight median particle size ($d_{50}$) value in the range from 0.1 μm to 7 μm,
      ii) a top cut ($d_{98}$) value of 15 μm or less,
      iii) a specific surface area (BET) from 0.5 to 120 m²/g, as measured by the BET method, and
      iv) a residual total moisture content from 0.01 wt. % to 1 wt. %, based on the total dry weight of the at least one calcium carbonate-containing filler material, and a surface-treatment layer on at least a part of the surface of the calcium carbonate-containing filler material, wherein the surface-treatment layer is formed by contacting the calcium carbonate-containing filler material with a surface treatment agent in an amount from 0.1 to 3 wt. %, based on the total dry weight of the calcium carbonate-containing filler material, and wherein the surface treatment agent comprises at least one carboxylic acid and/or a salt or anhydride thereof,
   b) providing a first polypropylene polymer being an isotactic polypropylene homopolymer having a melt flow rate MFR (230° C. /2.16 kg) in the range of 15 to 40 g/10 min, as measured according to EN ISO 1133: 2011,
   c) providing a second polypropylene polymer being an isotactic polypropylene homopolymer having a melt flow rate MFR (230° C. /2.16 kg) in the range of 15 to 40 g/10 min, as measured according to EN ISO 1133: 2011, d) forming a masterbatch by compounding the surface-treated calcium carbonate-containing filler material of step a) in an amount of 60 wt. % to 75 wt. %, based on the total weight of the masterbatch, with the first polypropylene polymer of step b), e) mixing the masterbatch of step d) with the second polypropylene polymer of step c) to obtain a mixture having a surface-treated calcium carbonate-containing filler material content in the range of 5 wt. % to 15 wt. %, based on the total weight of the mixture, f) forming the mixture of step e) into fibers having an average fiber diameter in the range from 11 to 30 µm, g) forming a fibrous web from the fibers of step f), and h) forming the non-woven fabric by hydroentanglement of the fibrous web of step g), wherein the water pressure during hydroentanglement step h) does not exceed 170 bar and wherein the final bonding step during hydroentanglement is carried out at a water pressure in the range of 80 to 170 bar.

2. The process of claim 1, wherein the nonwoven fabric has a water vapor transmission rate of at least 1000 g/(m² day), measured according to ASTM E398-13.

3. The process of claim 1, wherein the nonwoven fabric has a water vapor transmission rate of at least 3000 g/(m² day), measured according to ASTM E398-13.

4. The process of claim 1, wherein the surface-treated calcium carbonate-containing filler material of step a) comprises a calcium carbonate-containing filler material having prior to the surface treatment
i) a weight median particle size ($d_{50}$) value in the range from 0.25 µm to 5 µm, and/or
ii) a top cut ($d_{98}$) value of 15 µm or less, and/or
iii) a specific surface area (BET) from 0.5 to 120 m²/g, as measured by the BET method, and/or
iv) a residual total moisture content from 0.01 wt. % to 0.2 wt. %, based on the total dry weight of the at least one calcium carbonate-containing filler material.

5. The process of claim 1, wherein the surface-treated calcium carbonate-containing filler material of step a) comprises a calcium carbonate-containing filler material having prior to the surface treatment
i) a weight median particle size ($d_{50}$) value in the range from 1.0 to 3.5 µm, and/or
ii) a top cut ($d_{98}$) value of 7.5 µm or less, and/or
iii) a specific surface area (BET) from 0.5 to 15 m²/g, as measured by the BET method, and/or
iv) a residual total moisture content from 0.02 wt. % to 0.15 wt. %, based on the total dry weight of the at least one calcium carbonate-containing filler material.

6. The process of claim 1, wherein the surface-treated calcium carbonate-containing filler material of step a) comprises a surface-treatment layer on at least a part of the surface of the calcium carbonate-containing filler material, wherein the surface-treatment layer is formed by contacting the calcium carbonate-containing filler material with a surface treatment agent in an amount from 0.1 to 2.5 wt. %, based on the total dry weight of the calcium carbonate-containing filler material.

7. The process of claim 1, wherein the surface-treated calcium carbonate-containing filler material of step a) comprises a surface-treatment layer on at least a part of the surface of the calcium carbonate-containing filler material, wherein the surface-treatment layer is formed by contacting the calcium carbonate-containing filler material with a surface treatment agent in an amount from 0.2 to 0.8 wt. %, based on the total dry weight of the calcium carbonate-containing filler material.

8. The process of claim 1, wherein the surface treatment agent comprises at least one monocarboxylic acid and/or a salt or anhydride thereof.

9. The process of claim 1, wherein the surface treatment agent comprises stearic acid and/or a salt thereof.

10. The process of claim 1, wherein the surface treatment agent comprises at least one dicarboxylic acid and/or a salt or anhydride thereof.

11. The process of claim 1, wherein the surface treatment agent comprises at least one mono-substituted succinic anhydride.

12. The process of claim 1, wherein the first polypropylene polymer of step b) and/or the second polypropylene polymer of step c) is an isotactic polypropylene homopolymer having a melt flow rate MFR (230° C. /2.16 kg) in the range of 20 to 35 g/10 min, as measured according to EN ISO 1133:2011.

13. The process of claim 1, wherein the first polypropylene polymer of step b) and/or the second polypropylene polymer of step c) is an isotactic polypropylene homopolymer having a melt flow rate MFR (230° C. /2.16 kg) in the range of 25 to 35 g/10 min, as measured according to EN ISO 1133:2011 wherein the first polypropylene polymer of step b) and the second polypropylene polymer of step c) are the same polymer.

14. The process of claim 1, wherein the masterbatch is formed in step d) by compounding the surface-treated calcium carbonate-containing filler material of step a) in an amount of 65 wt. % to 74 wt. %, based on the total weight of the masterbatch, with the first polypropylene polymer of step b).

15. The process of claim 1, wherein the masterbatch is formed in step d) by compounding the surface-treated calcium carbonate-containing filler material of step a) in an amount of 68 wt. % to 72 wt. %, based on the total weight of the masterbatch, with the first polypropylene polymer of step b).

16. The process of claim 1, wherein the fibers formed in step f) are staple fibers having
an average fiber diameter in the range from 14 to 30 µm, and/or
a titer in the range from 1 to 6 dtex, as measured by EN ISO 2062:2009 and/or
a staple fiber length in the range from 30 to 90 mm.

17. The process of claim 1, wherein the fibers formed in step f) are staple fibers having
an average fiber diameter in the range from 14 to 25 um, and/or
a titer in the range from 1.5 to 4 dtex, as measured by EN ISO 2062:2009 and/or
a staple fiber length in the range from 40 to 60 mm,
wherein the staple fibers are formed from the mixture of step e) by a process comprising the steps of multifilament or monofilament extrusion and cutting, and/or
wherein the staple fibers are formed into a fibrous web during step g) by carding.

18. The process of claim 1, wherein the fibers formed in step f) are filaments having
an average fiber diameter in the range from 14 to 30 µm, and/or
a titer in the range from 1 to 6 dtex, as measured by EN ISO 2062:2009.

19. The process of claim 1, wherein the fibers formed in step f) are filaments having an average fiber diameter in the range from 14 to 25 μm, and/or a titer in the range from 1.5 to 4 dtex, as measured by EN ISO 2062:2009, wherein the filaments are formed from the mixture of step e) by spunbonding and/or meltblowing.

20. The process of claim 1, wherein in hydroentanglement step h)

the pre-bonding step is performed at a water pressure of 50 to 120 bar, and/or the water pressure does not exceed 160 bar, and/or the water pressure of the final bonding step is in the range of 90 to 160 bar, and/or at least 95% of the process water is reused, and/or the nonwoven fabric is dried after the final bonding step at a temperature below 135 °C.

21. The process of claim 1, wherein in hydroentanglement step h)

the pre-bonding step is performed at a water pressure of 65 to 105 bar, and/or the water pressure does not exceed 155 bar, and/or the water pressure of the final bonding step is in the range of 95 to 155 bar, and/or at least 99% of the process water is reused, and/or the nonwoven fabric is dried after the final bonding step at a temperature below 100 °C.

22. A nonwoven fabric formed from fibers, wherein the fibers have an average fiber diameter in the range from 11 to 30 μm and are composed of a mixture comprising a first polypropylene polymer, being an isotactic polypropylene homopolymer having a melt flow rate MFR (230° C. /2.16 kg) in the range of 15 to 40 g/10 min, as measured according to EN ISO 1133:2011 a second polypropylene polymer being an isotactic polypropylene homopolymer having a melt flow rate MFR (230° C. /2.16 kg) in the range of 15 to 40 g/10 min, as measured according to EN ISO 1133:2011 and a surface-treated calcium carbonate-containing filler material, the surface-treated calcium carbonate-containing filler material comprising a calcium carbonate-containing filler material having prior to the surface treatment i) a weight median particle size ($d_{50}$) value in the range from 0.1 μm to 7 μm, ii) a top cut ($d_{98}$) value of 15 μm or less, iii) a specific surface area (BET) from 0.5 to 120 m²/g, as measured by the BET method, and iv) a residual total moisture content of from 0.01 wt. % to 1 wt. %, based on the total dry weight of the at least one calcium carbonate-containing filler material, and a surface-treatment layer on at least a part of the surface of the calcium carbonate-containing filler material, wherein the surface-treatment layer is formed by contacting the calcium carbonate-containing filler material with a surface treatment agent in an amount from 0.1 to 3 wt. %, based on the total dry weight of the calcium carbonate-containing filler material, and wherein the surface treatment agent comprises at least one carboxylic acid and/or a salt or anhydride thereof;

wherein the surface-treated calcium carbonate-containing material is contained in the mixture in an amount from 5 wt. % to 15 wt. %, based on the total weight of the mixture, and wherein the nonwoven fabric has a water vapor transmission rate of at least 1000 g/(m² day), measured according to ASTM E398-13.

23. The nonwoven fabric of claim 22, wherein the nonwoven fabric has a water vapor transmission rate of at least 2000 g/(m² day), measured according to ASTM E398-13.

24. The nonwoven fabric of claim 22, wherein the nonwoven fabric has a water vapor transmission rate of at least 3000 g/(m² day), measured according to ASTM E398-13.

25. An article comprising the nonwoven fabric as obtained in the process according to claim 1.

26. An article comprising the nonwoven fabric of claim 22.

* * * * *